(12) United States Patent
Kayashima et al.

(10) Patent No.: US 7,143,151 B1
(45) Date of Patent: Nov. 28, 2006

(54) NETWORK MANAGEMENT SYSTEM FOR GENERATING SETUP INFORMATION FOR A PLURALITY OF DEVICES BASED ON COMMON META-LEVEL INFORMATION

(75) Inventors: Makoto Kayashima, Yamato (JP); Tatsuya Fujiyama, Yokohama (JP); Masato Terada, Sagamihara (JP); Yoshinori Watanabe, Chigasaki (JP); Takaaki Ogino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/314,629

(22) Filed: May 19, 1999

(30) Foreign Application Priority Data

May 19, 1998 (JP) ............................... P10-136614

(51) Int. Cl.
G06F 15/173 (2006.01)
(52) U.S. Cl. .................. 709/223; 709/220; 709/221; 709/222; 709/228; 709/238; 709/244; 370/351
(58) Field of Classification Search ........ 709/220–223, 709/227, 228, 229, 225, 238, 244, 249, 224; 370/351
See application file for complete search history.

(56) References Cited

U.S. PATENT DOCUMENTS

| | | | | |
|---|---|---|---|---|
| 5,838,907 A | * | 11/1998 | Hansen | 709/220 |
| 5,954,797 A | * | 9/1999 | Sidey | 709/223 |
| 5,968,176 A | * | 10/1999 | Nessett et al. | 713/201 |
| 6,104,716 A | * | 8/2000 | Crichton et al. | 370/401 |
| 6,128,656 A | * | 10/2000 | Matchefts et al. | 81/98 |
| 6,182,226 B1 | * | 1/2001 | Reid et al. | 709/225 |
| 6,243,747 B1 | * | 6/2001 | Lewis et al. | 709/220 |
| 6,243,815 B1 | * | 6/2001 | Antur et al. | 709/220 |

FOREIGN PATENT DOCUMENTS

| | | |
|---|---|---|
| JP | 969083 | 3/1997 |
| JP | 10200530 | 7/1998 |
| WO | 9854644 | 12/1998 |

OTHER PUBLICATIONS

Kubota, et al "A Study on an Automatic Generation and Recovery System of Network Devices Configuration Files", The Institute of Electronics, Information and Communication Engineers, Technical Report of IEICE, IN96-44, 1997 (with Abstract).
Watanabe et al "Virtual Private Network by Encryption and its Management Method", The Institute of Electronics, Information and Communication Engineers, Technical Report of IEICE, IN 97-113, 1997 (with Abstract).
Open Security ManagerTM, Mar. 22, 2005, pp. 1-2.
"Getting to the Root of the Policy Management", an article from Data Communications magazine ( May 21, 1998, vol. 21, No. 8).

* cited by examiner

*Primary Examiner*—Glenton B. Burgess
*Assistant Examiner*—Kevin Parton
(74) *Attorney, Agent, or Firm*—Mattingly, Stanger, Malur & Brundidge, P.C.

(57) ABSTRACT

A network management system which includes a plurality of network devices operating in a coordinated manner and a management server managing the network devices. The management server includes apparatus for defining policy information and for generating setup information using policy information to generate setup information for each network device. The system generates setup information for each network device, distributes setup information to each network device, installs setup information to each network device, enables settings, collects setup information for each network device, and organizes and checks for consistency in the collected information.

14 Claims, 19 Drawing Sheets

Firewall structure information table

| Domain name | Firewall name | Adjacent domain name |
|---|---|---|
| Domain 1 | Firewall 1 | Domain 2 |
| Domain 2 | Firewall 2 | Internet |
| Domain 2 | Firewall 1 | Domain 1 |
| Domain 3 | Firewall 3 | Internet |
| Domain 4 | Firewall 4 | Internet |
| Internet | Firewall 2 | Domain 2 |
| Internet | Firewall 3 | Domain 3 |
| Internet | Firewall 4 | Domain 4 |

NETWORK MANAGEMENT SYSTEM FOR GENERATING SETUP INFORMATION FOR A PLURALITY OF DEVICES BASED ON COMMON META-LEVEL INFORMATION

BACKGROUND OF THE INVENTION

The present invention relates to a network management system. More specifically, the present invention relates to a network management system that can do batch setup operations remotely for service applications operating through a plurality of coordinated network devices.

Conventionally, a technology that provides support for management of devices distributed over a network has been disclosed in Japanese laid-open patent publication number 9-69083 ("Method for distributed management and failure management"). This technology provides unified management through a network management mechanism working together with a system management mechanism. The network management mechanism performs network management on computers connected to a network, and the system management mechanism performs job control for the computers.

An example of a technology that provides management of tunneling in firewalls is presented in the Japanese laid-open patent publication number 10-200530 ("Method and system for managing"—this is a Japanese application filed in conjunction with a priority claim based on U.S. application Ser. No. 08/773,542). In this technology, the tunneling configurations between a plurality of networks are displayed graphically.

Furthermore, according to "Getting to the Root of Policy Management", an article from Data Communications magazine (May 21, 1998, Vol. 21, No. 8), there has been active discussion of the use of directory services to set up access policies in distributed server groups.

With the development of the Internet, various network devices and the software services that operate thereon have been developed and the settings involved in the use of these devices and services have gotten more complex. In particular, there has recently been an increase in software services in which a plurality of network devices operate in a coordinated manner. In these software services, consistency must be maintained not only within settings for a single unit, but also between the network devices.

An example of these types of settings includes settings used for tunneling in routers. Tunneling is a technology where a packet generated by a source is stored in another packet and transferred over a segment of a communication path. Tunneling is implemented through a pair of tunneling devices. Referring to FIG. 1, for example, there is shown a packet being sent from a host A of a network A to a host B of a network B. In order to provide tunneling between a router A and a router B in the path, the following operations must be performed:

(1) The router A receives a packet from the host A addressed to the host B in the network B. This router A encapsulates this packet in a packet with the source address set to the router A and destination address set to the router B. This packet is sent to the router B.

(2) The router B receives the packet from the router A and extracts a packet whose source address is the host A and whose destination address is the host B. This packet is sent through the network B.

If the host B is to reply to the host A with a packet that acknowledges receipt of the packet from the host A, the following operations are performed:

(3) The router B receives a packet from the host B addressed to the host A in the network A. This router B encapsulates this packet in a packet with the source address set to the router B and the destination address set to the router A. This packet is sent to the router A.

(4) The router A receives the packet from the router B and extracts a packet whose source address is the host B and whose destination address is the host A. This packet is sent through the network A.

To perform these operations, it must be assumed that:

The router A knows that packets addressed to the network B should be sent to the router B; and The router B knows that packets addressed to the network A should be sent to the router A.

The settings for the two routers must not contradict each other, i.e., there must be no inconsistencies between the settings.

A similar system of settings can be found in the access control settings used for a multi-level firewall. A firewall uses the source address and the destination address to determine whether or not to permit access. In the case of the network environment shown in FIG. 2, the host A accesses a server on the Internet through a firewall FW-A1 and a firewall FW-A. These are packet-filtering firewalls placed at the access points of their respective networks. Access control for this case involves the following operations: (1) the firewall FW-A1 permits access to communication in which the source address is the host A and the destination address is the Internet; and (2) the firewall FW-A permits access to communication in which the source address is the host A and the destination address is the Internet.

If the access control settings in the two firewalls contradict each other, the host A may not be able to communicate with the Internet or the host A may be able to communicate with unexpected addresses.

In conventional technology:

(1) A single computer provides unified management by linking a network management mechanism and computer jobs (Japanese laid-open patent publication number 9-69083);

(2) A pre-existing tunneling set-up is displayed graphically (Japanese laid-open patent publication number 10-200530). There have also been attempts to use a directory service to set up the access policies for distributed servers. However, none of these technologies focus on how to efficiently manage and distribute configuration files stored in distributed computers, and they do not provide features for maintaining consistency in the contents of the configuration files.

SUMMARY OF THE INVENTION

The object of the present invention is to provide two features. In the first feature, configuration files are generated and installed so that there are no contradictions between the contents of the settings, i.e., they are consistent with each other. In the second feature, consistency of the contents of the settings in the devices is checked. If there is an inconsistency for some reason, e.g., the first feature had not been used, a user (the person setting up the device) is notified.

A further object of the present invention is to implement a network management system that allows a "network to be used properly.

A further object of the present invention is to suggest updated settings using the first feature described above when the second feature described above finds an inconsistency.

To achieve the objects described above, the present invention provides a management server. The management server includes means for defining policy information to serve as meta-level information, and means for generating setup information for each network device. The following operations are performed: an operation to derive and generate setup information for each network device using a policy generated by a network manager at the management server; an operation to distribute the setup information to each network device via the network; and an operation to install and enable the setup information for each network device. The meta-level information referred to above indicates information that is to be used as a source for deriving or generating the setup information.

The following operations are also performed: an operation to collect the setup information from each network device at the network management server; and an operation to organize and check the collected information for consistency.

If a firewall or the like prevents the management server from directly distributing setup information to a network device, a data routing program is disposed at the firewall lying on the communication path between the management server and the network device to relay the setup information. Furthermore, mutual authentication and data encryption are performed between the data transfer program in the management server and the data routing programs in the firewalls.

In a unified firewall management system for networks in which firewalls are provided for each administrative unit-in the network, a management server is provided to set up management information settings in the firewalls. The management server includes a manager program that sets up management information that must be accessed through other firewalls.

The manager program uses client addresses of clients accessing services and server addresses of servers providing services in order to determine the firewalls to which setup information is to be sent.

The manager program also generates setup information based on information entered by a manager and sends the setup information to the firewalls.

With the present invention, multiple network devices can be set up so that their settings do not contradict each other, and settings that have already been prepared can be checked to see that there are no inconsistencies.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Figure 1:
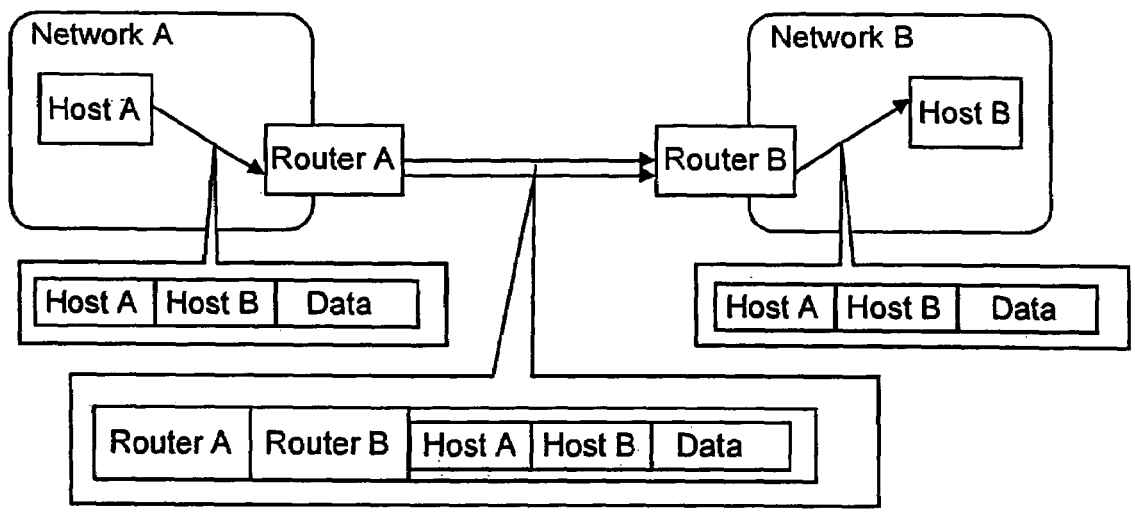
FIG. 1 is a block diagram for the purpose of describing the principles of tunneling.
Figure 2:
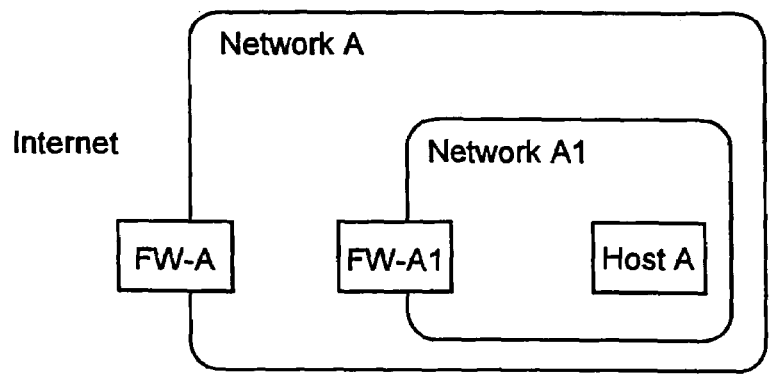
FIG. 2 is a block diagram for the purpose of describing a multi-level firewall environment.
Figure 3:
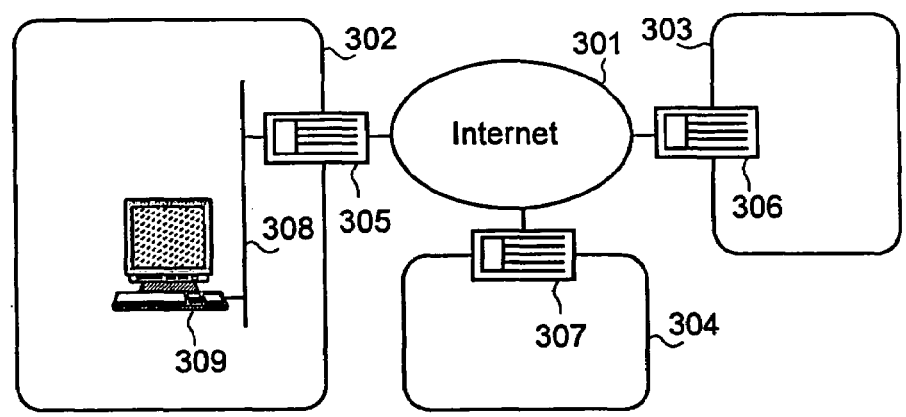
FIG. 3 is a block diagram showing the overall structure of an embodiment of the present invention.

The following description of a first embodiment of the present invention will be presented with reference to FIG. 3 through FIG. 8. FIG. 3 shows an example of an environment where the network management system of the present invention is used. In particular, the figure shows a case where tunneling settings must be generated for routers.

Referring to the figure, there is shown: the Internet 301; organizational networks 302 through 304; routers 305 through 307 that connect the organizational networks 302 through 304 to the Internet 301; a local network 308 within the organizational network 302; and a management server 309 set up in the local network 308.

For this embodiment, tunneling settings will be described with reference to tunneling between the organizational network 302 and the organizational network 303 and tunneling between the organizational network 302 and the organizational network 304.

Figure 4:
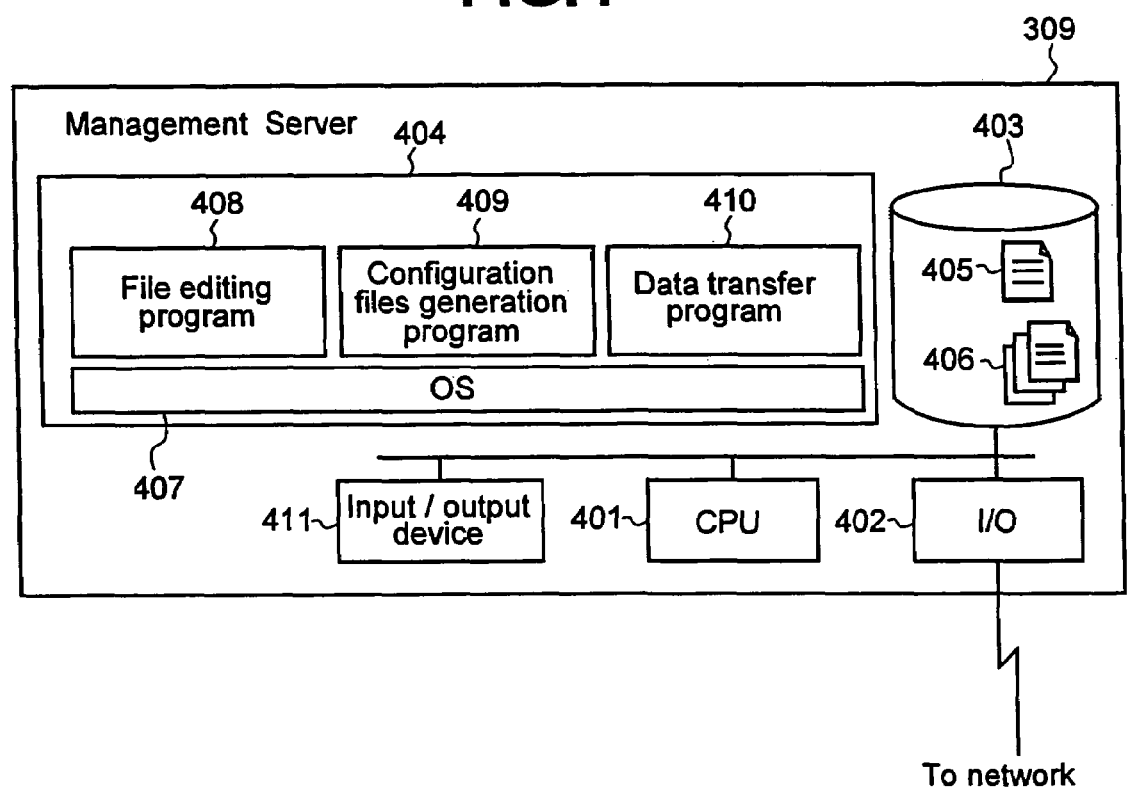
FIG. 4 is a block diagram showing the overall structure of a management server.

FIG. 4 shows the structure of the management server 309 used in the network management system according to the present invention. Referring to the figure, there is shown: a CPU 401; a network interface 402; a disk unit 403; a memory 404; a policy file 405 and configuration files 406 stored in the disk unit 403; programs 407 through 410 stored in the memory 404, including an operating system 407, a file editing program 408, a configuration file generating program 409 and a data transfer program 410; and input/output devices 411, including input devices, such as a keyboard, a mouse, or the like, and displaying devices, such as a CRT, a liquid crystal display, or the like. There is one configuration file 406 for each router. The file editing program 408 is used to create the policy file 405. The configuration file generation program 409 uses the policy file 405 as an input to generate configuration files for each router. The data transfer program 410 is used to transfer the configuration files 406 to the routers 306 and 307 through the router 305. The manager creates the configuration file 406 using the input/output devices of the management server 309. Another method would be to have the management server 309 accessed remotely from a management terminal.

Figure 5:
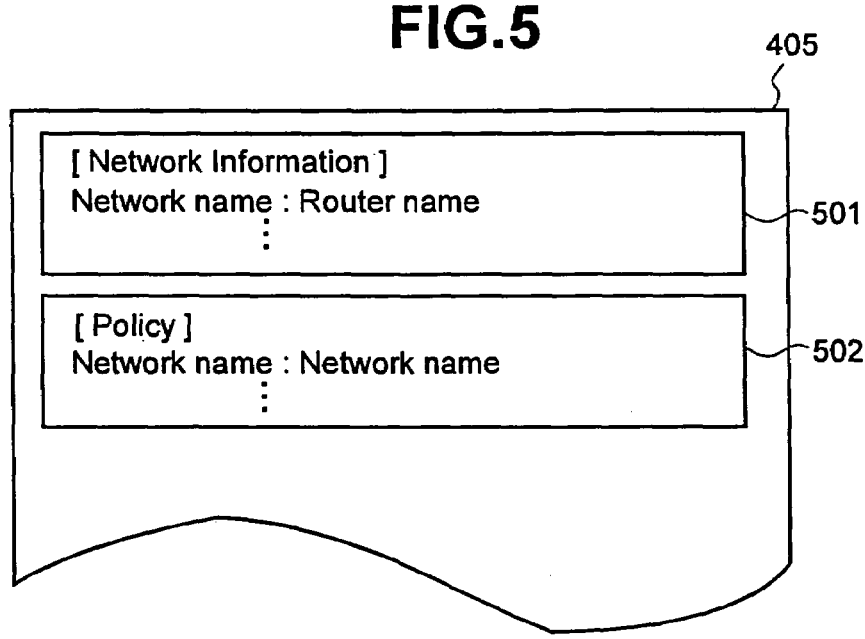
FIG. 5 is a block diagram showing the contents of a policy file from the first embodiment.

FIG. 5 shows the contents of the policy file 405 used by the network management system of the present invention. The policy file 405 includes a network information section 501 and a policy section 502.

The network information section 501 is a set of entries made up of two fields: one field containing a network name and the other field containing the router name that performs tunneling operations for communications to this network. In this embodiment, the first field is used for the network name, the second field is used for the router name, and a ":" is used to separate the two fields. For the network in this embodiment, the specific contents of the network information contained in the network information section 501 for the example shown in FIG. 3 would be as follows:

network 302: router 305
network 303: router 306
network 304: router 307

The first entry in this network information section 501 indicates that "tunneling for communication to the network 302 is performed by the router 305."

The policy section 502 is a set of entries consisting of two fields indicating the network names of the networks at the ends of a tunnel. In this embodiment, the network names for the networks at either end of a tunnel are placed in the first field and the second field, and a ":" is used to separate the fields. In the network in this embodiment, the specific contents for the policy set up in the policy section 502 for the example shown in FIG. 3 would be as follows:

network 302: network 303
network 302: network 304

The first entry in this policy section 502 indicates that "the network 302 and the network 303 are connected via tunneling".

Figure 6:
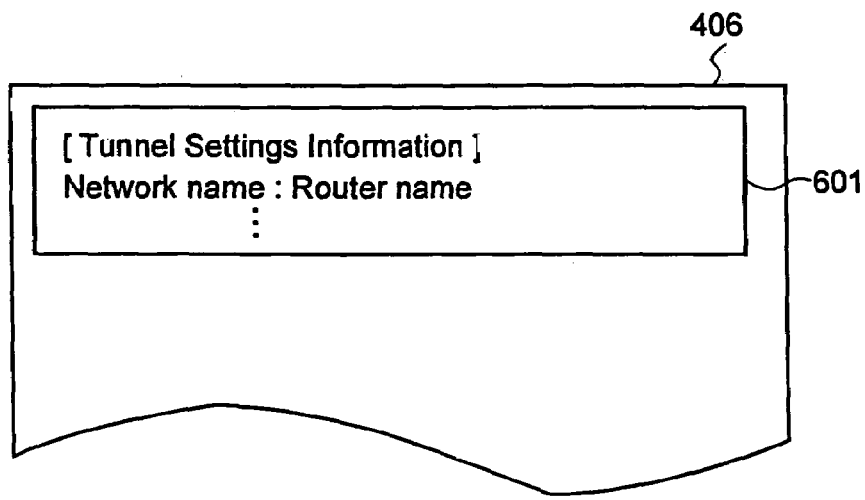
FIG. 6 is a block diagram showing the contents of a configuration file from the first embodiment.

FIG. 6 shows the contents of a configuration file 406 used by the network management system for the routers. The configuration file 406 contains a tunnel setup information section 601.

The tunnel setup information section 601 is a set of entries. Each entry consists of two fields, where one field indicates a destination network name for performing tunneling and one field indicates the router name for the router performing the tunneling for communication to this network. In this embodiment, the first field contains the destination network name, the second field contains the router name, and the two fields are separated by a ":".

In the network in this embodiment, the specific contents of the tunnel setup information set up in the tunnel setup information section 502 is as follows:

Tunnel setup information for the router 305
network 303: router 306
network 304: router 307
Tunnel settings for the router 306
network 302: router 305
Tunnel settings for the router 307
network 302: router 305

The network management system of the present invention provides two features. In the first feature, the policy file 405 shown in FIG. 5 is used to generate and distribute configuration files 406 for the routers as shown in FIG. 6. In the second feature, the reverse operation is performed by generating a policy file 405 from the configuration files 406 retrieved from the routers, and these settings are checked to see if there are any inconsistencies.

Figure 7:
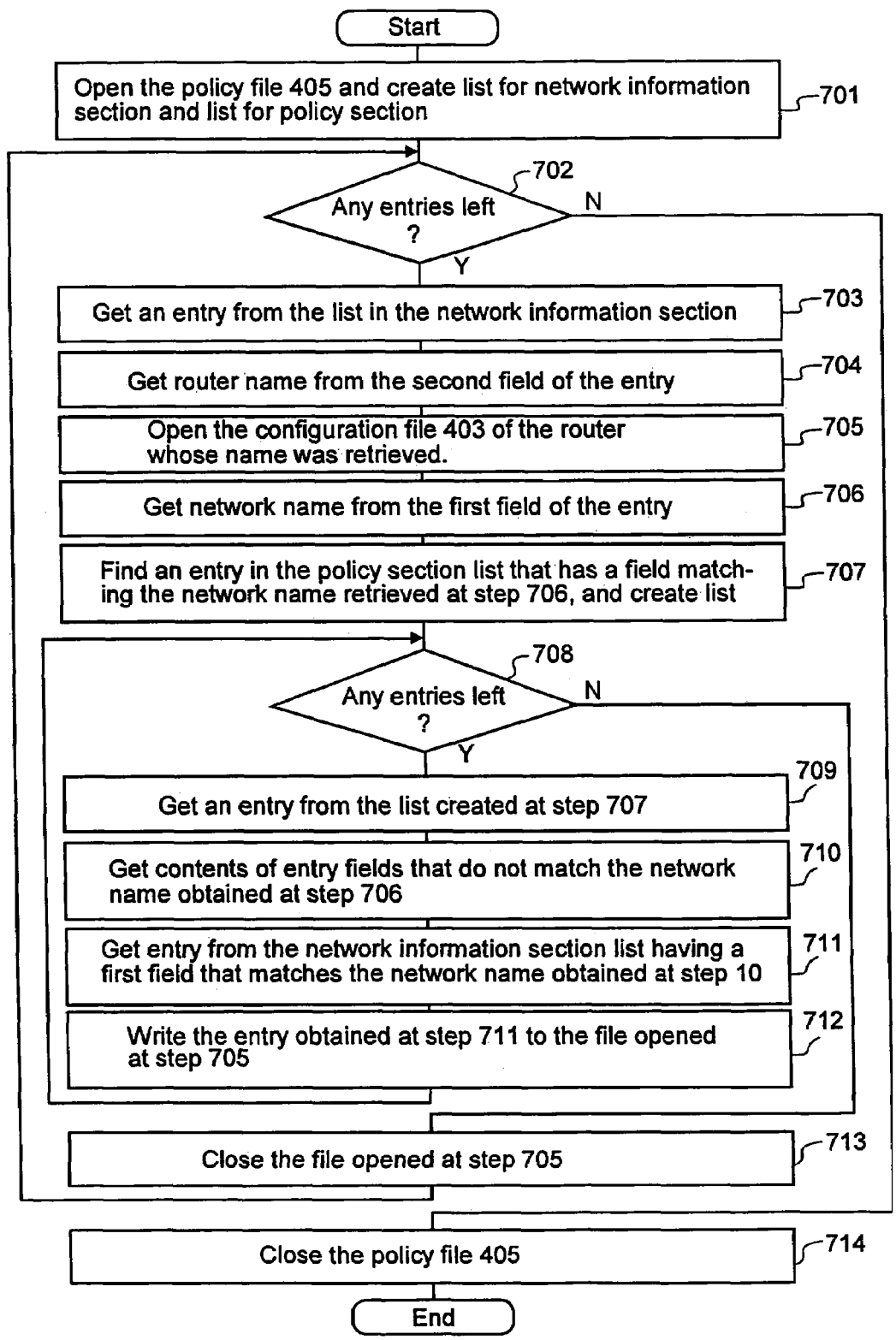
FIG. 7 is a flowchart showing the operations used to create a configuration file in the first embodiment.

FIG. 7 shows a flowchart indicating the operations performed in generating the configuration files 406 for the routers using the policy file 405. These operations implement the first feature described above, i.e. generating settings for the network devices and preventing contradictions/inconsistencies in these settings.

At step 701, the policy file 405 is opened and a list for the network information section and a list for the policy section are created.

At step 702, a check is performed to see if any entries remain in the list for the network information section generated at step 701.

Steps 703 through 713 are executed if there are remaining entries. At step 703, an entry is retrieved from the network information section list.

At step 704, a router name is retrieved from the second field of the entry retrieved at step 702.

At step 705, the configuration file 406 corresponding to the router whose name was retrieved is opened.

At step 706, a network name is retrieved from the first field of the entry retrieved at step 703.

At step 707, a list is generated by picking out entries from the policy section list that have a field matching the network name retrieved at step 706, and a list is generated.

At step 708, a check is made to see if there are any entries left in the policy section list created at step 701.

Step 709 through step 712 are executed if any entries are left.

At step 709, an entry is retrieved from the list generated at step 707.

At step 710, a network name is retrieved from the entry retrieved at step 709 by getting the field that doesn't match the network name retrieved at step 706.

At step 711, an entry having a first field that matches the network name from step 710 is retrieved from the entry from step 709.

At step 712, the entry retrieved at step 711 is written to the file opened at step 705.

Step 713 is executed if there are no remaining entries in the policy section list generated at step 701. Step 713 closes the file that was opened at step 705.

Step 714 is executed if there are no more entries in the network information section list generated at step 701. Step 714 closes the policy file 405.

By performing the operations described above, a configuration file 406 is generated for each router. The configuration file 406 for a router is then transferred to the corresponding router so that the router can be setup, thus implementing the first feature of the present invention.

Figure 8:
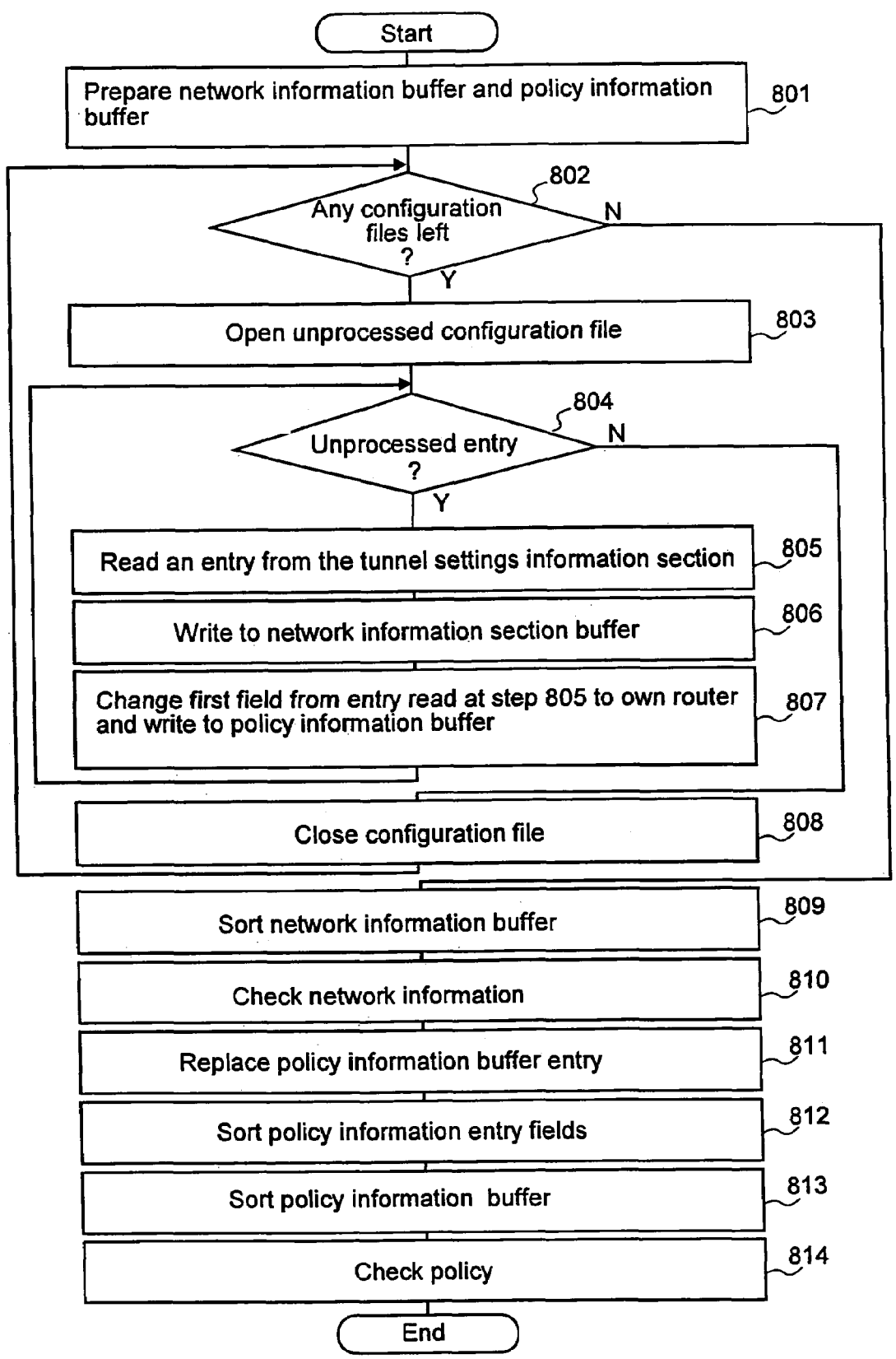
FIG. 8 is a flowchart showing the operations used to check consistency of configuration files in the first embodiment.

FIG. 8 is a flowchart that shows the operations performed to retrieve the configuration files 406 from the routers and to check the consistency of these files. This operations check is performed to see that there are no contradictions in the contents of the settings for the different devices, i.e. that consistency is confirmed, thus implementing the second feature.

Step 801 sets up a network information buffer, which holds entries from the network information section 501 as shown in FIG. 5, and a policy information buffer, which holds entries from the policy section 502.

Step 802 checks to see if any of the router configuration files 406 have not been processed yet.

Step 803 through step 808 are executed if there are any unprocessed configuration files 406.

At step 803, a configuration file 406 is opened.

Step 804 checks to see if any of the entries from the tunnel setup information section in the open configuration file 406 have not been processed yet.

Step 805 through step 807 are executed if there are any unprocessed entries.

At step 805, an unprocessed entry is read.

At step 806, the entry read at step 805 is written to the network information buffer.

At step 807, the first field of the entry read at step 805 is converted to the name of the router currently being processed, and, this is written to the policy information buffer.

Step 808 is executed if there are no unprocessed entries. At step 808, the configuration file 406 opened at step 803 is closed.

At step 809, the network information buffer is sorted using the second field as the key.

Step 810 checks the contents of the network information buffer to see if there are any entries having identical second fields but different first fields. The results are displayed and reported using the input/output device 411.

At step 811, the router name in the second field of each entry in the policy information buffer is replaced with the network name using the contents of the network information buffer.

At step 812, the fields in the entries from the policy information buffer are sorted.

At step 813, the entries in the policy information buffer are sorted.

Step 814 checks to see if the policy information buffer consists of sets of two identical entries. The results are displayed and reported using the input/output device 411.

By performing the operations described above and the checking performed at step 810 through step 814, the configuration files 406 can be checked for consistency and the results can be displayed and reported using the input/output device 411, thus implementing the second feature.

Figure 9:
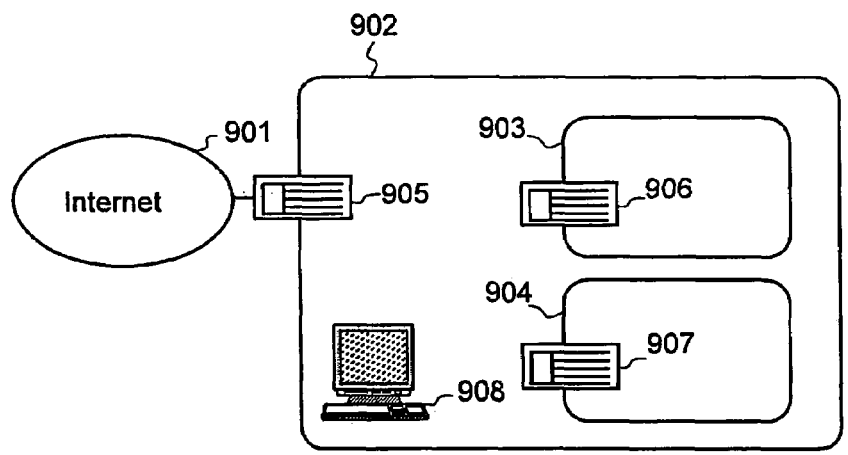
FIG. 9 is a block diagram showing the overall structure of the second embodiment.

The following is a description of a second embodiment of the present invention, in which reference will be made to FIG. 9 through FIG. 13. FIG. 9 shows an example of an environment in which the network management system of the present invention is implemented. More specifically, this example presents a setup where access control settings are made for a packet-filtering firewall.

Packet filtering is a technology in which packets are filtered based on source IP address, destination IP address, and the like (as described, for example, in "Firewall, Internet Technologies," by Takaragi et al, Shoukoudou).

Referring to FIG. 9, there is shown the Internet 901, an organizational network 902, a sub-network 903 within the organizational network 902, another sub-network 904 within the organizational network 902, a packet-filtering firewall 905 positioned at the access point of the organizational network 902, a packet-filtering firewall 906 positioned at the access point of the sub-network 903, a packet-filtering firewall 907 positioned at the access point of the sub-network 904, and a management server 908.

In the sample access control settings used in this embodiment, communication is allowed if the source address is any one of the hosts in the sub-network 903 and the destination address is any host on the Internet. Communication is also allowed if the source address is any one of the hosts in the sub-network 904 and the destination address is any one of the hosts in the sub-network 903.

Figure 10:
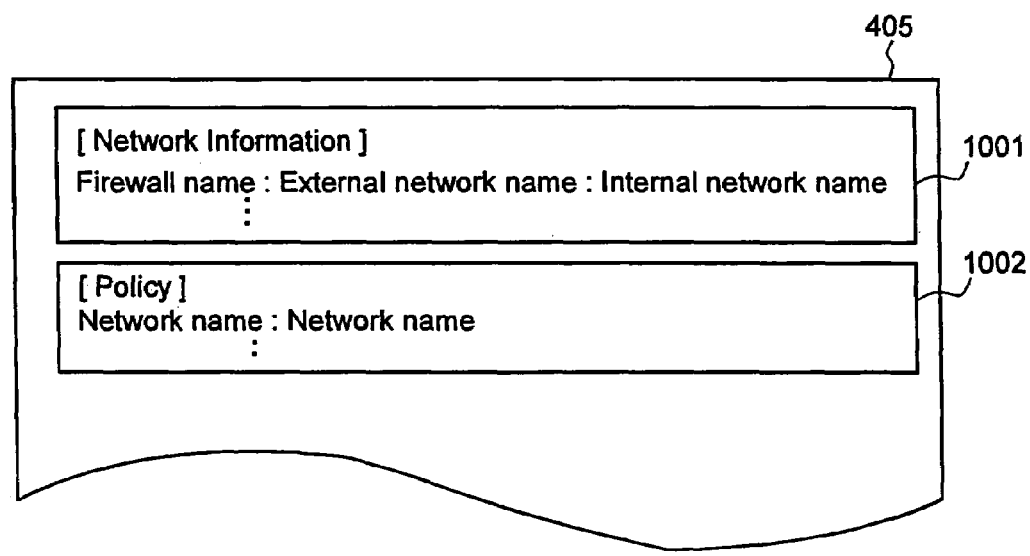
FIG. 10 is a diagram showing the contents of a policy file from the second embodiment.

FIG. 10 shows the contents of the policy file 405 for the firewalls.

The policy file 405 used in this embodiment includes a network information section 1001 and a policy section 1002.

The network information section 1001 is a set of entries formed from three fields: a firewall name; a network name outside of this firewall; and a network name inside of and protected by this firewall. In this embodiment, the first field specifies the firewall name, the second field specifies the outside network name; and the third field specifies the inside network name. In the network for this embodiment, the network information section 1001 for the example shown in FIG. 9 would be as follows:

firewall 905: organizational network 902: Internet 901
firewall 906: sub-network 903: organizational network 902
firewall 907: sub-network 904: organizational network 902

The first entry in this network information section 11001 signifies that "the firewall 905 acts as a gateway for communications from the organizational network 902 to the Internet."

In the policy section 1002, the first field indicates a source address and the second field indicates a destination address. In the network for this embodiment, the specific policy settings in the policy section 1002 for the network in this embodiment are as follows:

sub-network 903: Internet 901
subnetwork 904: sub-network 903

The first entry in this policy section 1002 signifies that "communication is possible if the source is a host in the sub-network 903 and the destination is a host on the Internet 901."

Figure 11:
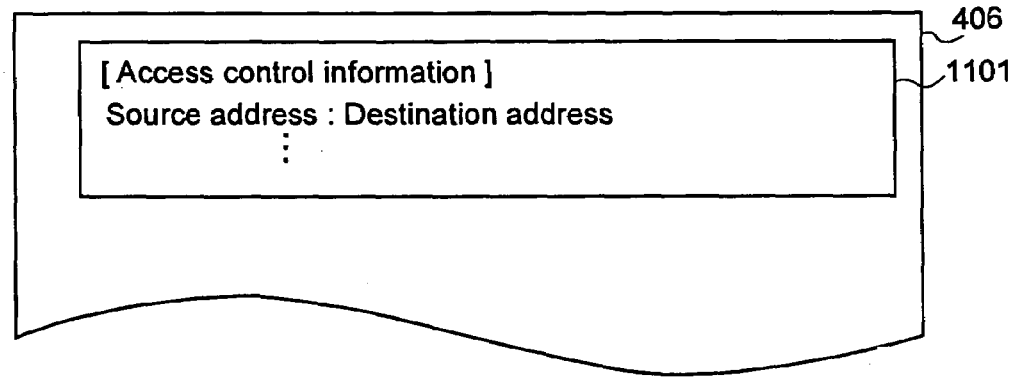
FIG. 11 is a diagram showing the contents of a configuration file from the second embodiment.

FIG. 11 shows the contents of the firewall configuration files 406 used in this embodiment. The configuration file 406 includes an access control information section 1101.

The access control information section 1101 is a set of entries having two fields to be used for a source address and a destination address. In this embodiment, the first field is the source address, the second field is the destination address, and the two fields are separated by a ":".

In the network in this embodiment, the specific contents of the access control information settings in the access control information section 1101 are as follows:

Access control information for the firewall 905 sub-network
903: Internet 901
Access control information for the firewall 906
sub-network 903: Internet 901
sub-network 904: sub-network 903
Access control information for the firewall 907
sub-network 904: sub-network 903

Figure 12:
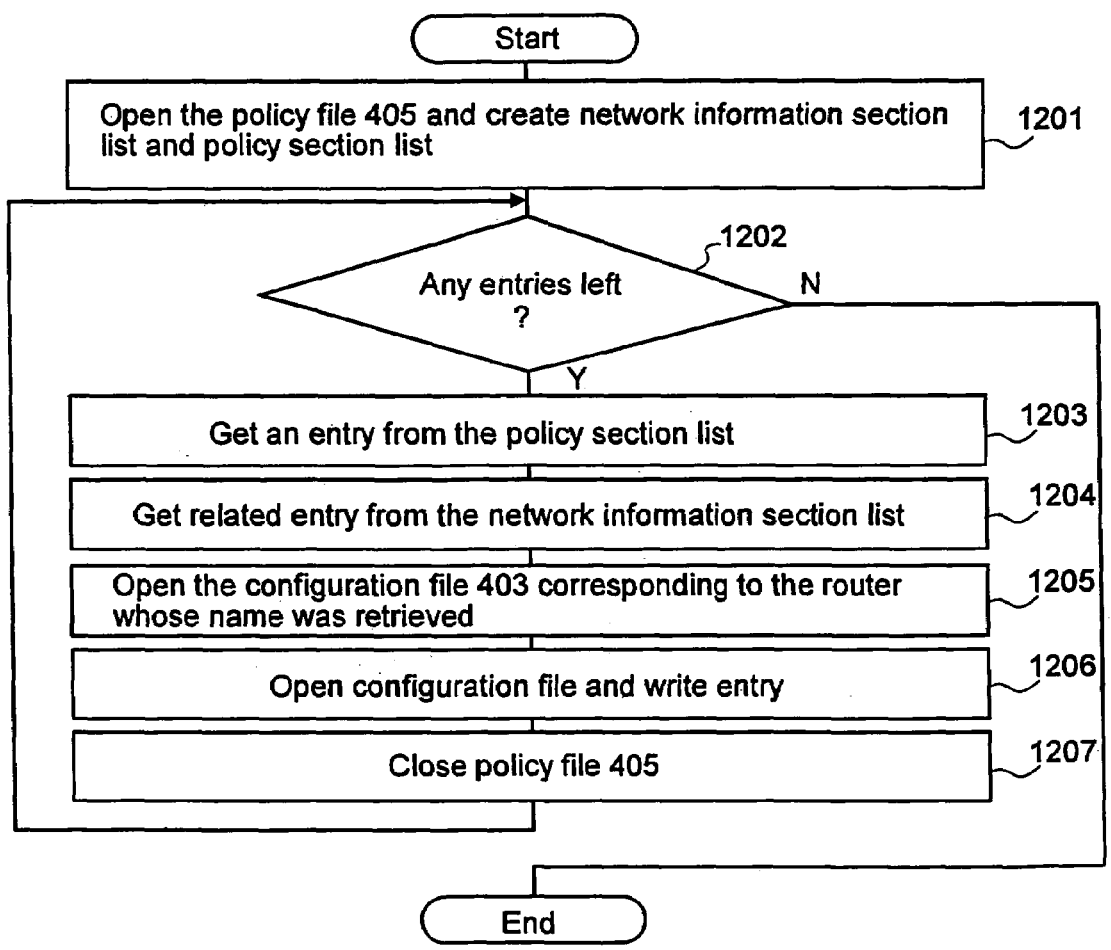
FIG. 12 is a flowchart showing the operations performed to create a configuration file for the second embodiment.

FIG. 12 is a flowchart showing the operations used to generate the firewall configuration files 406 from the policy file 405.

At step 1201, the policy file 405 is opened and a list for the network information section 1001 and a list for the policy section 1002 are generated.

Step 1202 checks to see if any entries are left in the policy section list generated at step 1201.

Step 1203 through step 1206 are executed if any entries are left.

At step 1203, an entry is retrieved from the policy section list.

At step 1204, the entries relating to the entry retrieved at step 1203 are retrieved from the network information section list.

At step 1205, the firewall configuration files 406 for the firewalls indicated by the first fields of the entries retrieved at step 1204 are opened, and the policy section entry retrieved at step 1203 is written to these files.

At step 1206, the configuration files 406 opened at step 1205 are closed.

By performing the operations described above, a configuration file 406 is generated for each firewall. By transferring and installing the configuration files 406 to their respective firewalls, the first feature of the present invention can be implemented.

Figure 13:
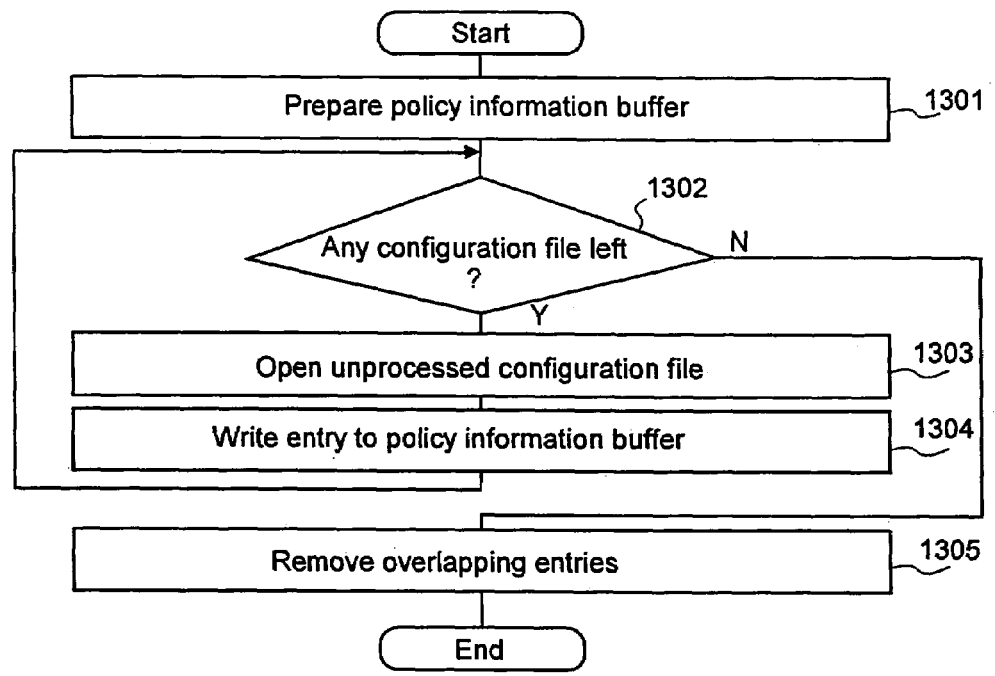
FIG. 13 is a flowchart showing the operations performed to check for consistency in the configuration files in the second embodiment.

FIG. 13 is a flowchart showing the operations performed to check for consistency after the firewall configuration files have been collected.

At step 1301, a policy information buffer for holding the policy section 1002 shown in FIG. 10 is prepared.

Step 1302 checks to see if there are any unprocessed firewall configuration files 406.

Step 1303 through step 1304 are executed if there are any unprocessed configuration files 406.

At step 1303 a configuration file 406 is opened.

At step 1304, the entry from the access control information section in the opened configuration file 406 is written to the policy information buffer.

At step 1305, duplicate entries in the policy information buffer are removed.

The entries in the policy information buffer generated by these operations indicate pairs of sources and destinations for which communication is permitted. This information can be checked to see if there is consistency in the configuration files 406. By displaying and reporting the results via the input/output device 411, the second feature can be implemented.

Figure 14:
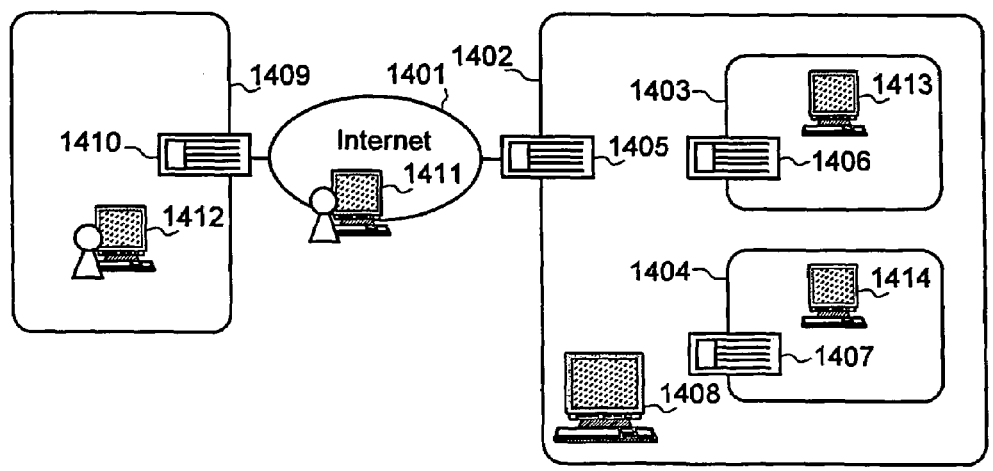
FIG. 14 is a block diagram showing the overall structure of the third embodiment.

The following is a description of a third embodiment of the present invention, in which reference will be made to FIG. 14 through FIG. 19. FIG. 14 shows an example of an environment for the network management system according to the present invention. More specifically, what is shown is a case where access control settings are created for application gateway firewalls.

Referring to FIG. 14, there is shown the Internet 1401, an organizational network 1402, a sub-network 1403 of the organizational network 1402, another sub-network 1404 of the organizational network 1403, an application gateway firewall 1405 positioned at the access point of the organizational network 1402, an application gateway 1406 positioned at the access point of the sub-network 1403, an application gateway firewall 1407 positioned at the access point of the sub-network. 1404, a management server 1408, a remote network 1409 connected via the Internet 1401, an application gateway firewall 1410 positioned at the access point of the remote network 1409, a client computer 1411 used by a user A via the Internet 1401, a client computer 1412 used by a user B via the organizational network 1409, a server computer 1413 in the sub-network 1403, and a server computer 1414 in the sub-network 1404.

The following is a description of this embodiment and presents an example of access control settings where (1) the user A on the client computer 1411 is permited access to use the telnet protocol via the Internet 1401 on the server computer 1413 in the sub-network 1403; and (2) the user B on the client computer 1412 is allowed use of the ftp protocol via the remote network 1409 on the server computer 1414 in the sub-network 1404.

Figure 15:
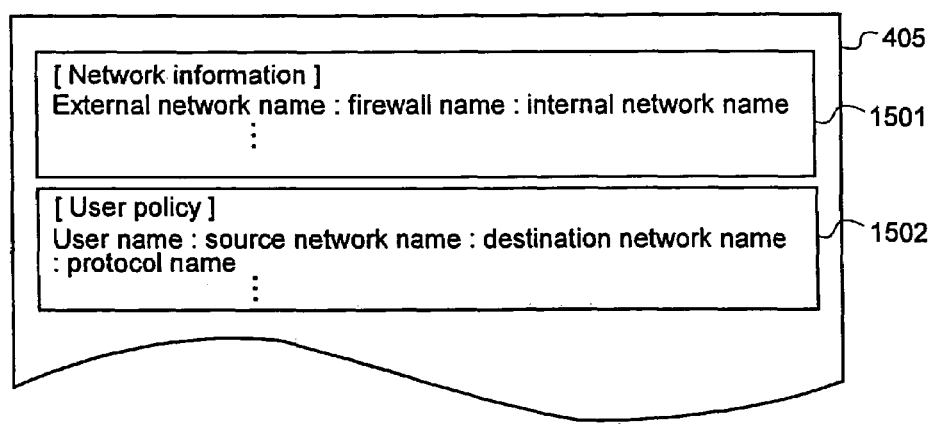
FIG. 15 is a block diagram showing the contents of a policy file from the third embodiment.

FIG. 15 shows the contents of the policy file 405 for the firewalls used in this embodiment.

The policy file 405 used in this embodiment includes a network information section 1501 and a user policy section 1502.

The network information section 1501 is a set of entries having three fields: the network name of a network outside the firewall, the firewall name, and the network name of a network inside of and protected by the firewall. In this embodiment, the first field is used for the outer network name, the second field is used for the firewall name, and the third field is used for the inner network name. In the network for this embodiment, the specific settings for the network information section 1501 for the example shown in FIG. 14 are as follows:

Internet 1401: firewall 1405: organizational network 1402
Internet 1401:
firewall 1410: remote network 1409
organizational network 1402: firewall 1406: sub-network 1403
organizational network 1402: firewall 1407: sub-network 1404

Figure 16:
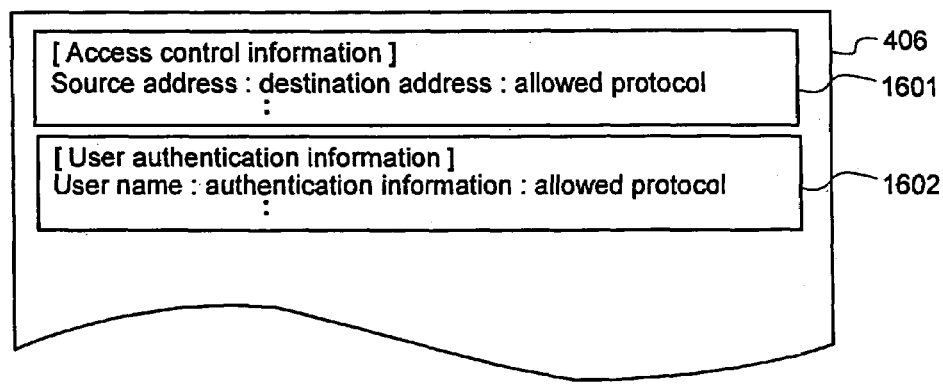
FIG. 16 is a drawing showing the contents of the configuration file from the third embodiment.

The user policy section 1502 is a set of entries having four fields: a user name, the network name for a network permitted to be a source, the network name for a network permitted to be a destination, and a protocol name for a protocol that can be used. In this system, entries are created per network user for whom access control is to be performed. In this embodiment, the first field is used for the user name, the second field is used for the source network name, the third field is used for the destination network name, and the fourth field is used for the protocol name. For these settings, it would also be possible to specify source and destination network names for each host name. For the protocol name, multiple protocols can be specified together. In the network for this embodiment, the specific contents of the user policy settings in the user policy section 1502 for the example shown in FIG. 14 would be as follows.

user A: Internet 1401: sub-network 1403: telnet
user B: remote network 1409: sub-network 1404: ftp FIG. 16 shows the contents of the configuration files 406 for the firewalls used in this embodiment. The configuration file 406 includes an access control information section 1601 and a user authentication information section 1602.

Figure 17:
FIG. 17 is a diagram showing the contents of a path information list used to create configuration files in the third embodiment.

The access control information section, 1601 is a set of three fields specifying a source address, a destination address, and an allowed protocol. In this embodiment, the first field is used for the source address, the second field is used for the destination address, the third field is used for the protocol, and, a ":" is used to separate the fields. These addresses can be specified by host or by network. In this embodiment, the specific user policy settings for the access control information section 1601 would be as follows:

Configuration file for the firewall 1405
Internet 1401: firewall 1406: telnet
Configuration file for the firewall 1406
firewall 1405: sub-network 1403: telnet
Configuration file for the firewall 1407
organizational network 1402: sub-network 1404: ftp
Configuration file for the firewall 1410
remote network 1409: firewall 1405: ftp The user authentication information section 1602 is a collection of settings having three fields: a user name, authentication information such as a user password or an encryption key, and the protocol name for a protocol that this user is allowed to use. In this embodiment, the first field is used for the user name, the second field is used for the authentication information, the third field is used for the protocol name, and a ":" is used to separate the fields. In the network in this embodiment, the specific contents of the user authentication information settings in the user information section 1602, would be as follows:

User authentication information for the firewall 1405
user A: (password string): telnet
user B: (password string): ftp
User authentication information for the firewall 1406
user A: (password string): telnet
User authentication information for the firewall 1407
user B: (password string): ftp
User authentication information for the firewall 1410
user B: (password string): ftp FIG. 17 shows the contents of a path information list 1701 used to generate the configuration files for this embodiment. The path information list contains a variable number of cells holding network names or firewall names and is created by the user at the time the network device is installed by the user (the person installing the device). The network names and the firewalls that separate the networks positioned between the source network and the destination network are stored sequentially, as shown in FIG. 17.

Using the path information list 1701, it is possible to specify a source and destination range handled by each firewall. For a particular firewall, the network positioned one element back and the firewall positioned two elements back become the source, and the network positioned one element forward and the firewall positioned two elements forward become the destination.

If a firewall is adjacent to the source, there will not be a firewall positioned two elements back. Also, if a firewall is positioned adjacent to the destination, there will not be a firewall positioned two elements forward.

Figure 18:
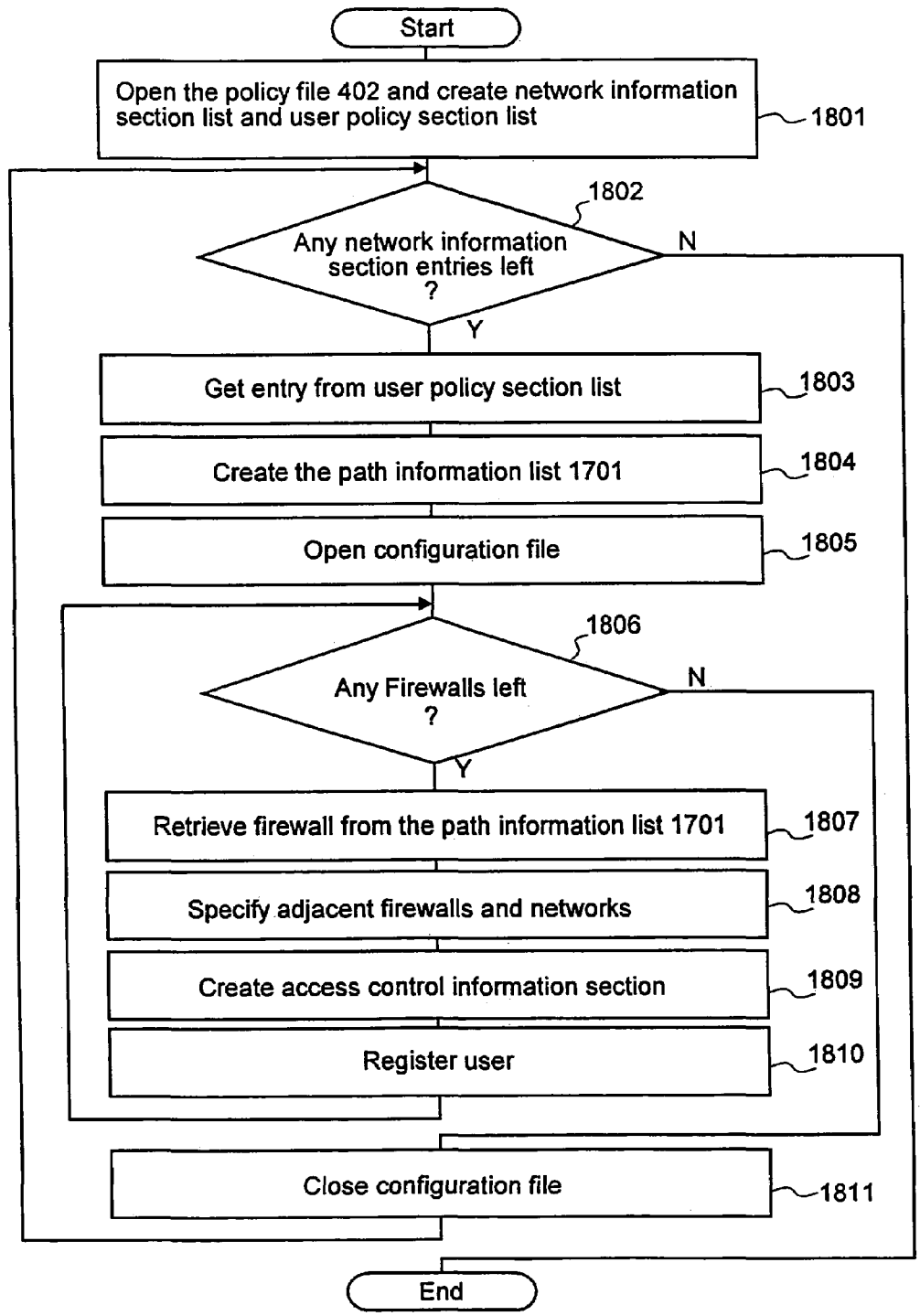
FIG. 18 is a flowchart showing the operations performed to generate the firewall configuration files in the third embodiment.

FIG. 18 is a flowchart showing the operations performed to generate the firewall configuration files 406 using the policy file 405.

At step 1801, the policy file 405 is opened and lists are generated for the network information section 1501 and the user policy section 1502.

Step 1802 checks the user policy section list generated at step 1801 to see if there are any entries left.

Step 1803 through step 1809 are executed if there are any entries remaining.

At step 1803, an entry is retrieved from the user policy section list.

At step 1804, the list for the network information section 1501 is used to determine a firewall positioned in the communication path indicated by the entry retrieved at step 1803, and a path information list 1701 is generated from the source in this entry to the destination.

At step 1805, the configuration files 406 for the firewalls in the path information list 1701 generated at step 1804 are opened.

Step 1806 checks to see if there are any unprocessed firewalls left in the path information list 1701.

At step 1807, a firewall is retrieved from the path information list 1701 generated at step 1805.

At step 1808, the path information list 1701 is used to determine a network and a firewall that are adjacent to the firewall retrieved at step 1807.

At step 1809, the information from step 1808 is used to generate an entry in the access control information section 1601 of the configuration file 406 for the firewall retrieved at step 1807.

Step 1810 closes the configuration files 406 for the firewalls contained in the path information list 1701 generated at step 1804.

By performing the operations described above, a configuration file 406 for each of the firewalls can be generated. By transferring and setting up the configuration files 406 to their respective firewalls, the first feature of the present invention can be implemented.

Figure 19:
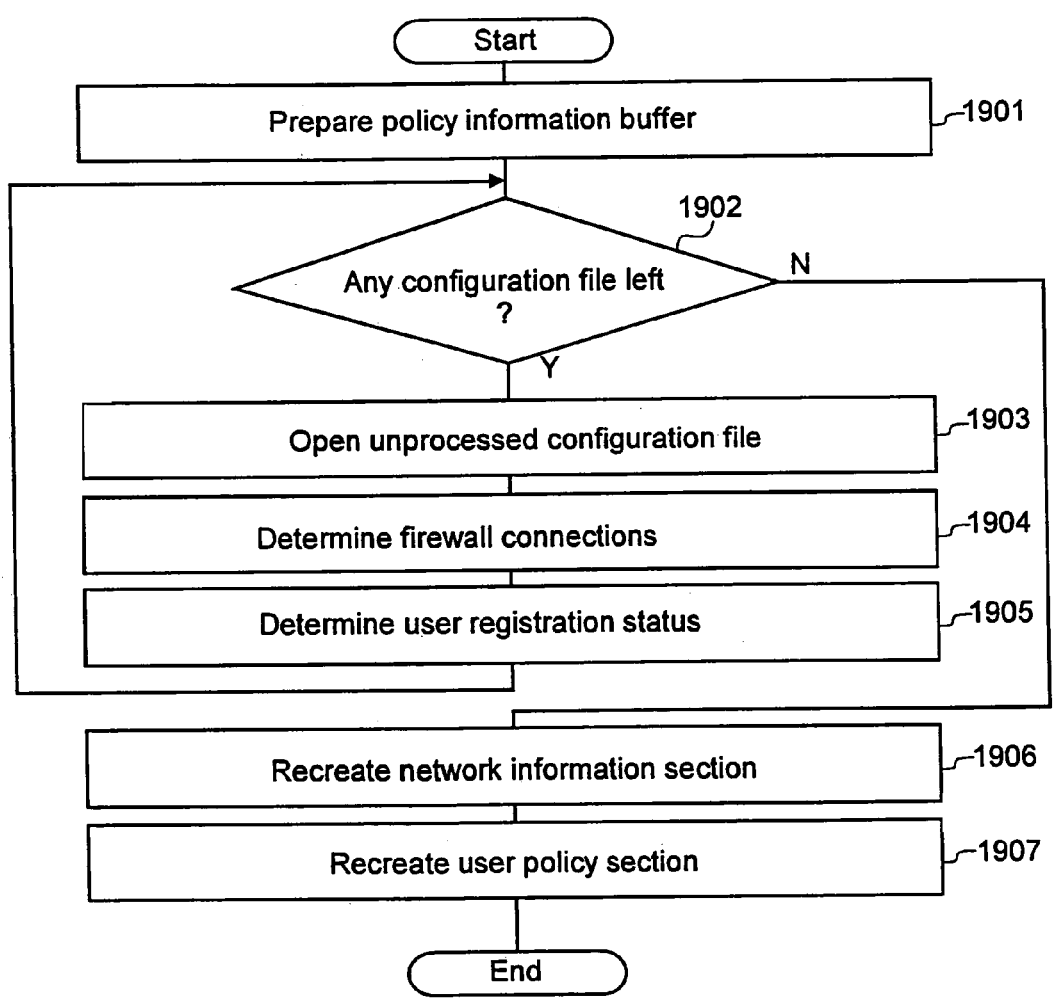
FIG. 19 is a flowchart showing the operations used to check for consistency in the configuration files from the third embodiment.

FIG. 19 is a flowchart showing the operations used to check for consistency after the firewall configuration files 406 are collected.

At step 1901, a policy information buffer for storing the user policy section 1502 shown in FIG. 15 is prepared.

Step 1902 checks to see if any unprocessed firewall configuration files 406 are left.

Step 1903 through step 1905 are executed if any unprocessed configuration files 406 are left.

At step 1903, a configuration file 406 is opened.

At step 1904, the access control information section 1601 from the configuration file 406 opened at step 1903 is used to determine the connections to the firewall. For each entry in the access control information section 1601, a record is generated with the first field of the entry, the name of the firewall set up by the configuration file 406, and the second field of the entry. The entries are recorded in the policy information buffer.

At step 1905, the user information section 1602 from the configuration file 406 opened at step 1903 is used to determine user registration status. For each entry in the user information section 1607, a record is generated with the first field of the entry, the name of the firewall set up by the configuration file 406, and the third field of the entry. The entries are recorded in the policy information buffer.

At step 1906, the records recorded in the policy information buffer at step 1904 are used to rebuild the network information section 1501 of the policy file 405.

At step 1907, the records recorded in the policy information buffer at step 1905 are used to rebuild the user policy section 1502 of the policy file 405.

By performing the operations described above, the policy file is checked and the configuration files 406 are checked for consistency, thus implementing the second feature of the present invention.

Figure 20:
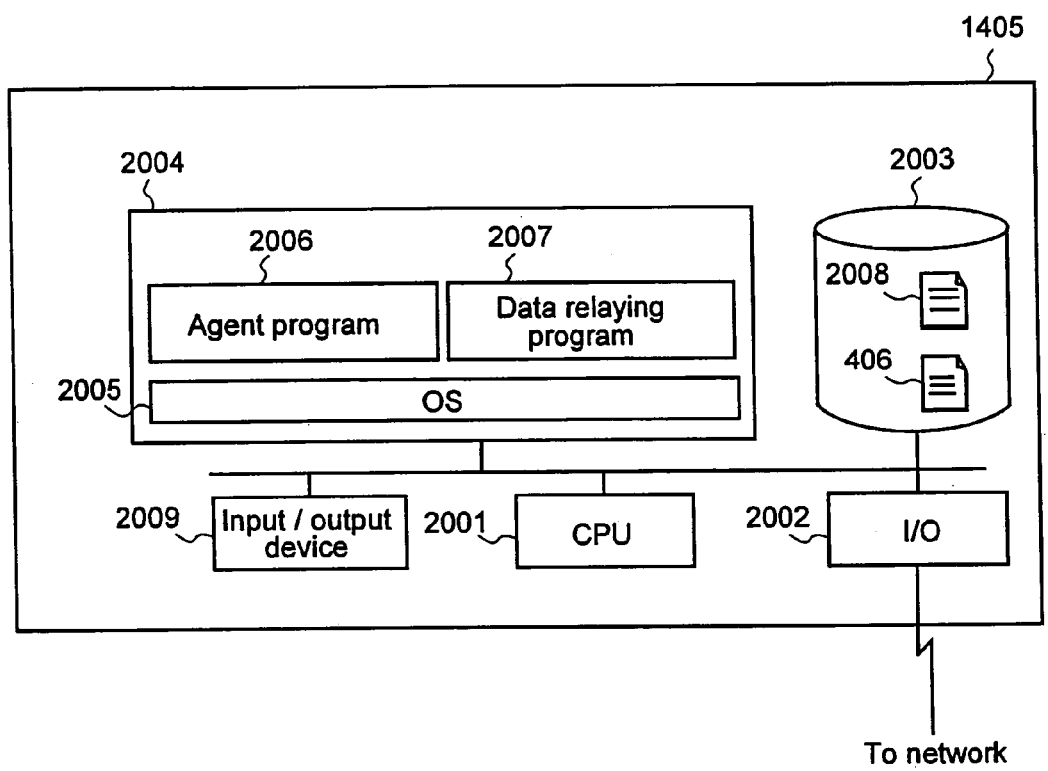
FIG. 20 is a block diagram showing the structure of a network device placed in a communication path used to send setup information from the management server to the firewall.

FIG. 20 shows the structure used in FIG. 14, particularly for the firewall 1410 and the firewall 1405, which are network devices on the communication path used to distribute setup information from the management server to the firewall 1410. Referring to FIG. 20, there is shown a CPU 2001, a network interface 2002, a disk unit 2003, a memory 2004, programs 2005 through 2007 in the memory, including an operating system 2005, an agent program 2006, a data relaying program 2007 and a relay path information table 2008 used by the data relaying program 2007 to determine a relay destination, and an input/output device 2009, such as a keyboard or mouse.

The management server sends the setup information 406 to the target firewall 1410 through the data relaying program 2007 of the firewall 1405, which is on the path. This allows settings to be made for the firewall 1410. The firewall 1410 uses the agent program 2006 and installs the received configuration file 406. To prevent illicit alteration or leakage of setup information, mutual authentication and data encryption can be performed between the data transfer program 410 on the management server 1408 and the data relaying program 2007 on the firewall 1405, which is on the path. Also, mutual authentication and data encryption can be performed between the data transfer program 410 on the management server 1408 and the data relaying program 2007 on the target firewall 1410.

The following is a description of a fourth embodiment, which provides a more specific implementation of the third embodiment.

[Network Structure for a Unified Firewall Management System]

First, the network structure of the unified firewall management system according to this embodiment will be described with reference to FIG. 21.

Figure 21:
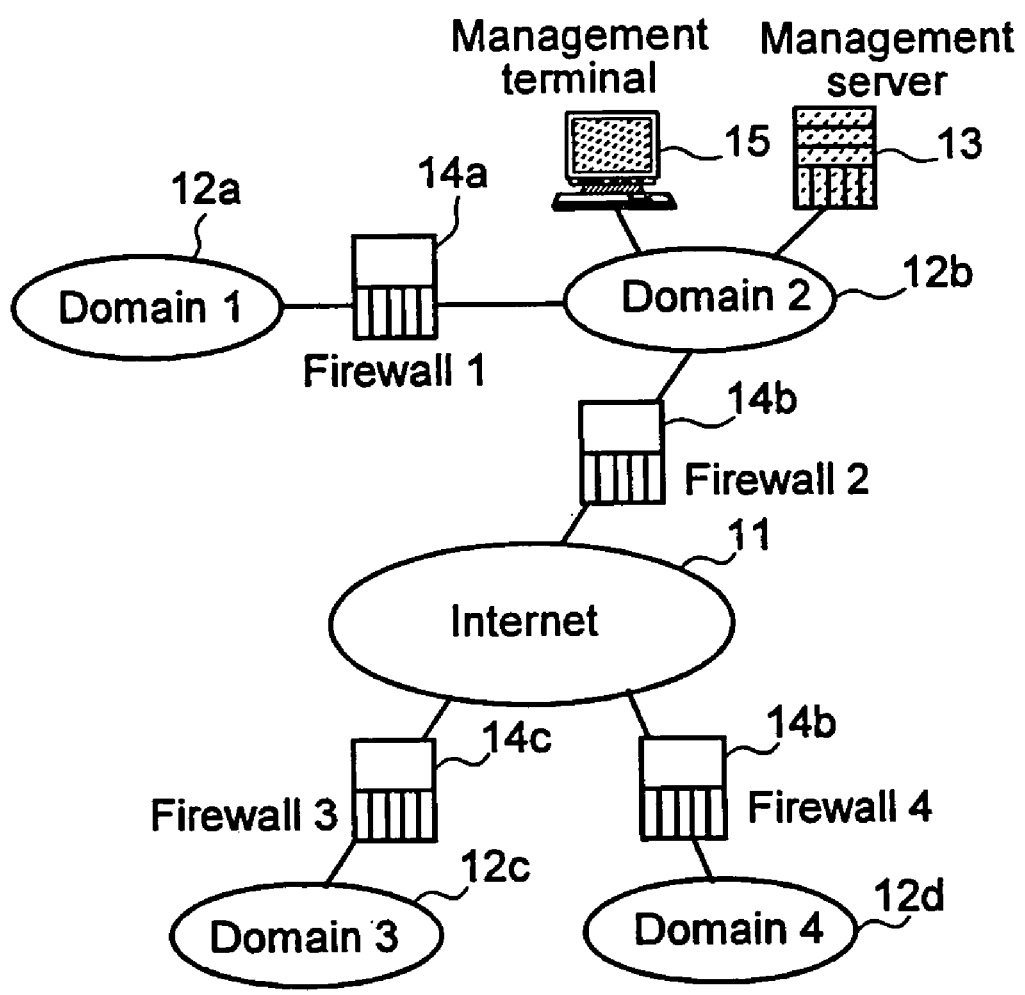
FIG. 21 is a block diagram showing the network structure in a unified firewall management system according to the fourth embodiment.

FIG. 21 shows the network structure of the unified firewall management system according to this embodiment.

The following description will cover the use of TCP (Transmission Control Protocol)/IP (Internet Protocol), which is the defacto standard protocol used on the Internet.

A domain 12a through a domain 12d serve as the units by which the network is managed, with a single domain being managed by a unified policy. Each domain is also connected to the Internet 11, which is an open network that can be accessed by an indeterminate number of users. Furthermore, a firewall 14a through a firewall 14d are interposed between each domain and the outside networks in order to control access and prevent unauthorized intrusions from the outside.

A management server 13 and a management terminal 15 are connected to the domain 2. The management server 13 is a server providing firewall management features. The management terminal 15 is a terminal provided to allow a manager to perform firewall management operations. Conventionally, management of firewalls has been performed from a terminal connected to the same domain as the firewall. However, in accordance with the present invention, the management server 13 and the management terminal 15 can be used to set up management information settings for a firewall connected to another domain.

In this embodiment, the management terminal 15 provides, a user interface for performing management operations, but it would also be possible to have the network set up so that management operations can be performed from the management server.

The domain 12a through the domain 12d use the open Internet to provide a virtual private network (VPN). To do this, installation of firewalls is required for is security.

[Hardware Structure in the Unified Firewall Management System]

Figure 22:
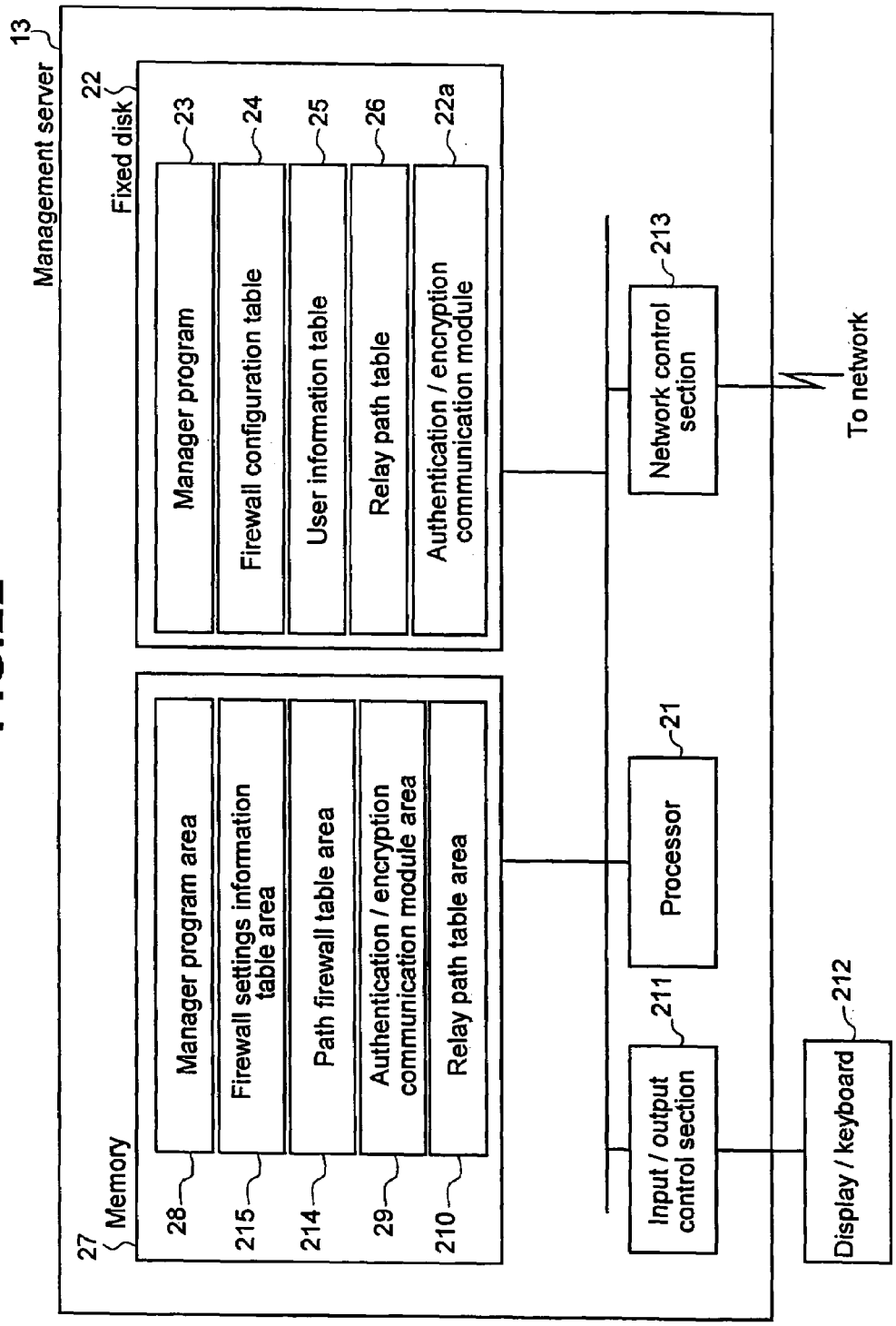
FIG. 22 is a block diagram showing the hardware structure of a management server 13 according to the fourth embodiment.
Figure 23:
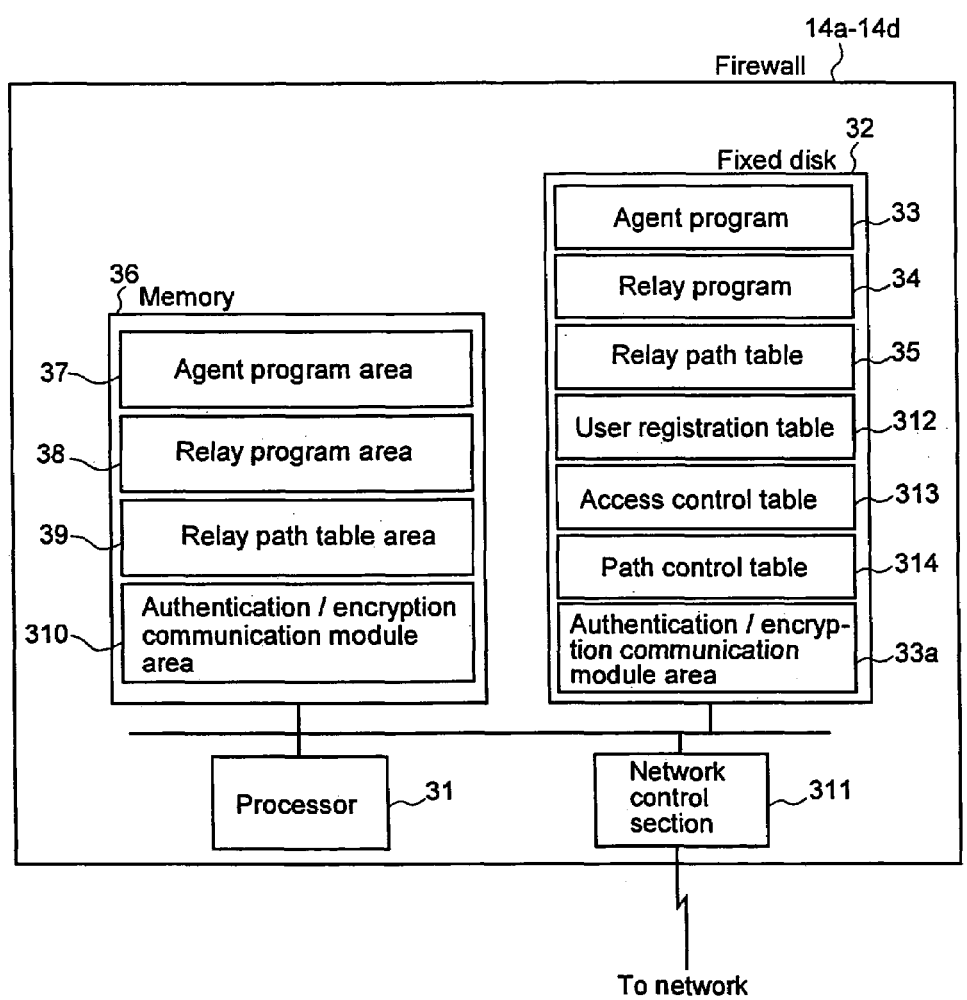
FIG. 23 is a block diagram showing the hardware structure of firewalls 14a–14d according to the fourth embodiment.
Figure 24:
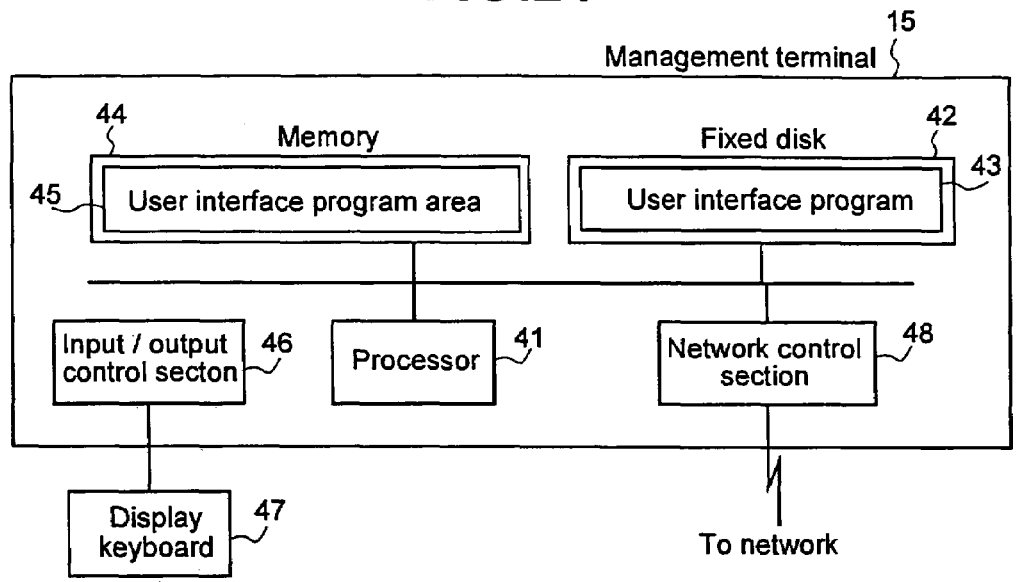
FIG. 24 is a block diagram showing the hardware structure of a management terminal 15 from the fourth embodiment.

The following is a description of the different hardware structures used in the unified firewall management system according to this embodiment, in which reference will be made to FIG. 22 through FIG. 24.

First, the hardware structure used in the management server 13 of this embodiment will be described with reference to FIG. 22.

The management server 13 includes a processor 21, a hard disk 22, a memory 27, an input/output control section 211, and a network control section 213.

The processor 21 is a unit that controls operation between the hardware elements in the computer and performs programmed operations. The hard disk 22 is a high-capacity secondary memory device that holds programs and tables. The memory 27, which is generally formed from semiconductor elements, loads programs and provides temporary data storage. The input/output control section 211 controls externally connected input and output devices such as displays and a keyboard 212. The network control device 213 controls connection with other computers.

The hard disk 22 contains a program to implement the unified firewall management system according to the present invention as well as various tables. The manager program 23 is a management program operating on the management server that uses the information entered by the manager to generate control information for setting up firewalls and sends this information to the firewalls. An authentication/encryption module 22a is called from the manager program 23 to provide authentication and encrypted communication. A firewall structure information table 24 is a table that indicates the connection between firewalls and domains. The user information table 25 is a table that holds various user information and includes network usage information and path information for each user. A relay path table 26 is a table containing a destination address and a relay destination address, which is the next connection target address. When setup information is to be sent to a firewall, the relay path table 26 holds the address of the firewall that will relay the connection.

The contents and features of the tables presented here will be described in further detail later.

As described above, the memory 27 is used to store programs loaded from the hard disk and to temporarily save data. The memory 27 is divided up logically into separate areas. A manager program area 28 is an area for storing the manager program 23. An authentication/encryption communication module area 29 is an area where the authentication/encryption communication module is loaded. A firewall setup information table area 215 is an area for storing the firewall setup information table 215, which is generated dynamically when management information settings for the firewall are prepared. A path firewall table area 214 is an area for storing the path firewall table. A relay path table area 210 is an area for storing the relay path table. The firewall setup information table 215 and the path firewall table area 214 will be described later.

The following is a description of the hardware structures used in the firewall 14a through the firewall 14d according to this embodiment, in which reference will be made to FIG. 23.

The firewall 14a through the firewall 14d include a processor 31, a hard disk 32, a memory 36, and a network control section 311. The features thereof are similar to those of the management server 13.

As with the management server 13, the hard disks 32 of the firewall 14a through the firewall 14d are used to store the programs for implementing the unified firewall management system according to the present invention as well as various tables. An agent program 33 is a program that serves as an agent for the manager program on the firewall. The agent program 33 receives firewall setup information sent from the manager program and sets up the various tables in the firewall. As with the management server 13, a relay path table 35 is a table containing destination addresses and relay destination addresses, which are the destination addresses for subsequent connections. When sending setup information to the firewall, the table is used to store the address of the firewall that will relay the connection.

A relay program 34 is a program that, when packets containing setup information for a firewall are to be sent to that firewall, allows the firewalls in the path to relay connections. A relay path table 35 is used to relay the connection to the next firewall. An authentication/encryption communication module 33a is called from the agent program 33 and provides authentication and encrypted communication features. A user registration table 312 holds user registration information and is used to perform authentication when a user accesses a service. An access control table 313 is a table holding various types of information necessary for users to access services. A path control table 314 is a table for storing path information for packets when a user accesses a service.

The memory 36 in the firewall 14a through 14d stores data and is divided up into an agent program area 37, a relay program area 38, a relay path table area 39, and an authentication/encryption communication module area 310. The agent program area 37 is an area for storing the agent program 33. The relay program area 38 is an area for storing the relay program 34. The relay path table area 39 is an area for storing relay path tables. The authentication/encryption communication module area 310 is an area where the authentication/encryption communication module is loaded.

The following is a description of the hardware structure in the management terminal 15 according to this embodiment, in which reference will be made to FIG. 24.

The management terminal 15 includes a processor 41, a hard disk 42, a memory 44, an input/output control section 46, a display keyboard 47, and a network control section 48. The various features of the management terminal 15 are similar to those described with regard to the management server 13.

A user interface program 43 is stored in the hard disk 42 in the management terminal 15. When executed, the program is loaded into a user interface program area 45 in the memory 44. The user interface program is a program that provides a user interface for the network manager to control the firewall.

[Operations for Setting Up Firewalls in the Unified Firewall Management System]

The following is a description of the operations used to set up firewalls in the unified firewall management system according to the present invention, in which reference will be made to FIG. 25 through FIG. 29.

Figure 25:
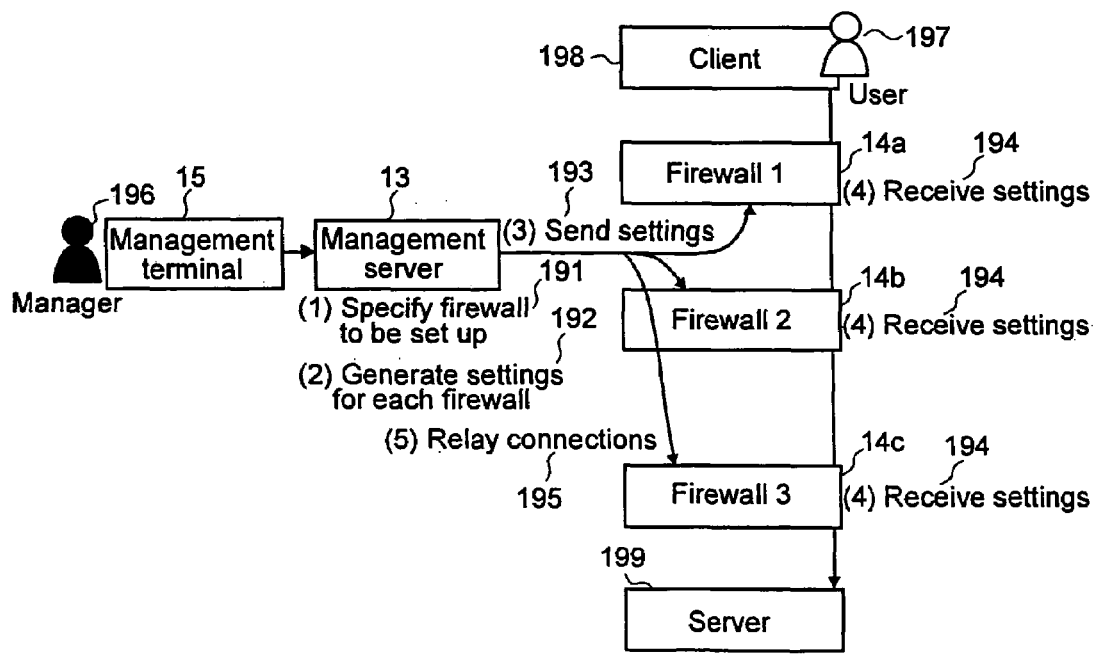
FIG. 25 is a schematic diagram showing the operations performed by the unified firewall management system in the fourth embodiment to set up firewalls.

FIG. 25 shows a schematic representation of the operations performed by the unified firewall management system according to the present invention to set up firewalls.

The example shown in FIG. 25 is based on the system structure shown in FIG. 21 and assumes that a firewall is to be set up so that only an authenticated user 197 can access a server 199 via a client 198.

To set up this type of firewall, the management server 13 performs the following operations in sequence. The following operations are shown in FIG. 25:

(1) an operation 191 for determining the firewalls to be set up (2) an operation 192 for generating setup information for each firewall (3) an operation 193 for sending the firewall setup information to the corresponding firewall (4) an operation 194 for having each firewall receive and set up the setup information (5) an operation 195 for having the firewall relay the connection Referring to FIG. 26 through FIG. 30, the following description of the operation 191 for determining the firewalls to be set up will be provided as a specific example of the third embodiment.

Figures 26, 27:
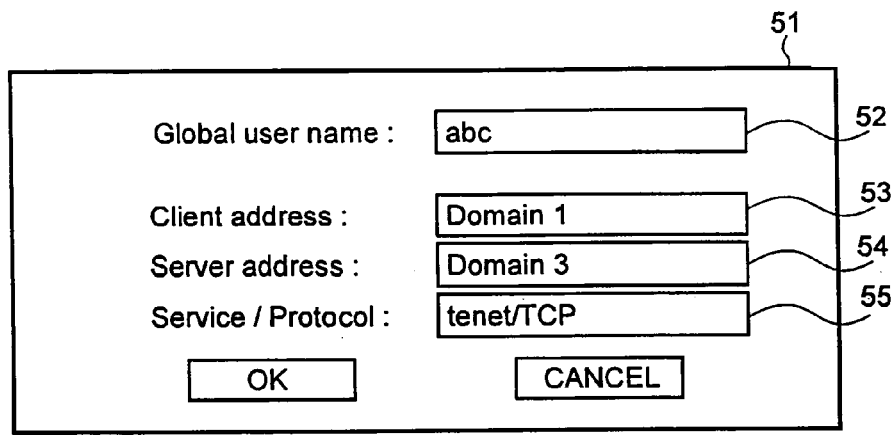
FIG. 26 is a diagram showing an input screen 51 on a management terminal
that is used when the administrator enters setup information in the fourth embodiment.
FIG. 27 is a diagram showing the firewall structure information table on the management server 13 in the fourth embodiment.

FIG. 26 shows an input screen 51 displayed on the management terminal 15 when the manager is entering setup information. The input screen 51 is displayed on the output device of the display/keyboard 47. The information entered by the manager corresponds to the user policies set up in the policy section 1502 shown in FIG. 15.

FIG. 27 shows a firewall structure information table 24 in the management server 13. This table corresponds to the network information set up in the network information section 1501 shown in FIG. 15.

Figure 28:
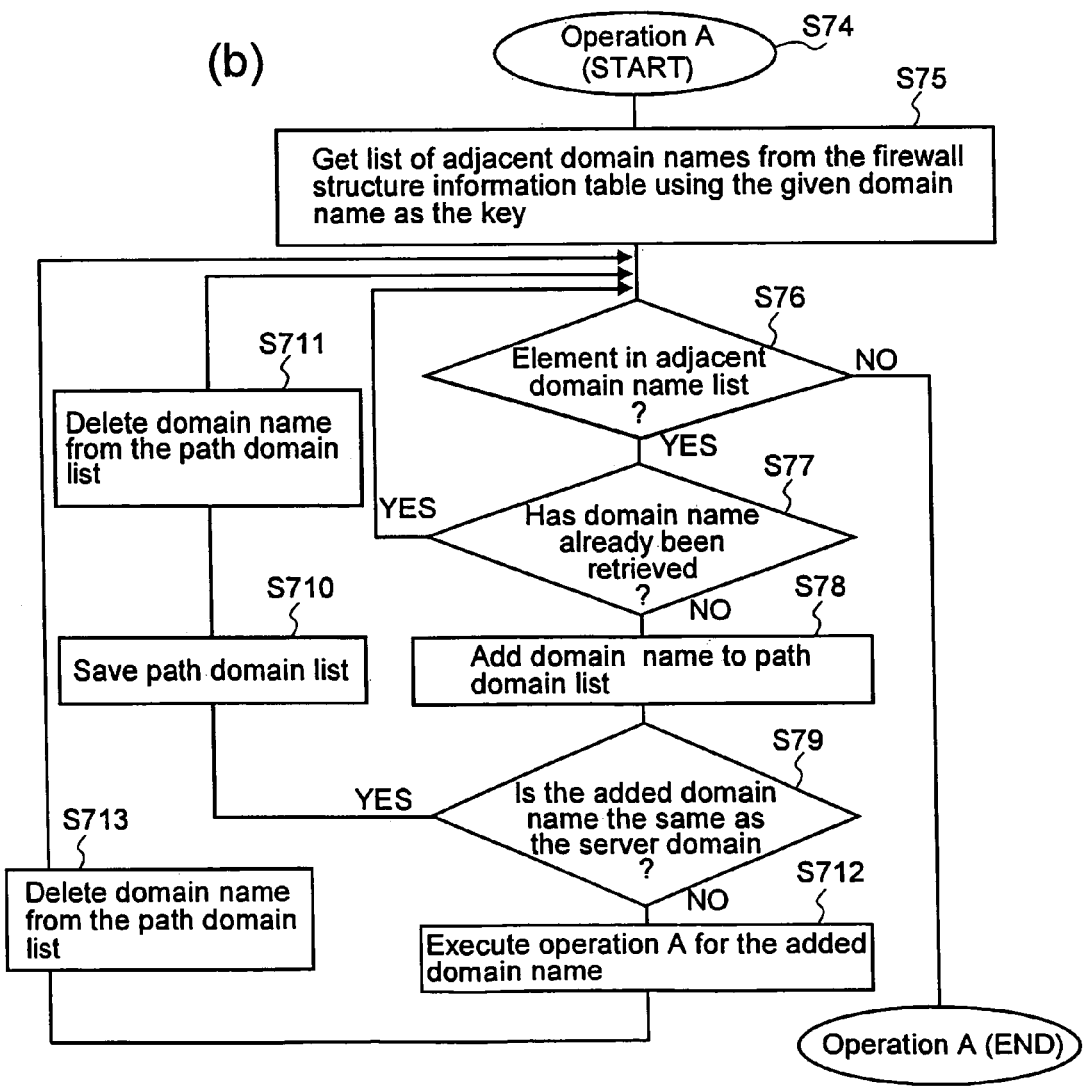
FIGS. 28(a) and 28(b) are flowcharts of the operations used to specify the firewall to be set up by a manager program 23 in the fourth embodiment.

FIGS. 28(*a*) and 28(*b*) show flowcharts for the operations used to determine the firewall to be set up by the manager program 23. These flowcharts correspond to a section of the flowchart shown in FIG. 18 for the operations used to generate the configuration file 406.

Figures 29, 30:
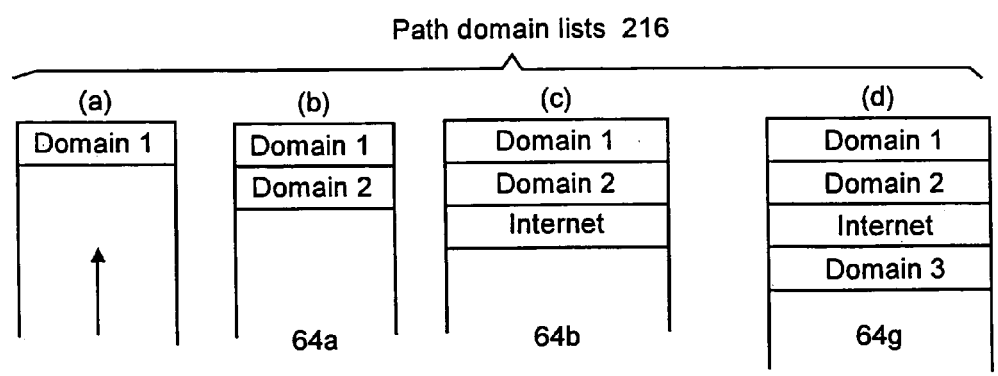
FIG. 29 is a diagram showing the contents of the path domain list 216 in the fourth embodiment at various states.
FIG. 30 is a diagram showing a path firewall table 214 on a management server 13 from the fourth embodiment.

FIG. 29 shows the contents of a path domain list 216 at different states.

FIG. 30 shows a path firewall table 214 on the management server 13.

In order to have firewalls effectively protecting the network, the firewalls for which settings are needed must be determined based on the network structure and be set up based on the pattern in which an authenticated user accesses a server. To do this, the manager enters the necessary settings using the management terminal 15 shown in FIG. 25.

In FIG. 26, a user identifier (global user name) 52 is a unique name that is globally valid within the network in which a user can access these services. A client address 54 is an address of a client used by a user. A server address 54 is an address of a server from which a user accesses a service. This address, which uniquely identifies a computer or a network, is specified in a format based on DNS (Domain Name System) that must be valid throughout the entire network.

A service name 55 contains the name of a service used by user. The example in FIG. 26 presents input information for a case where a user having the global user name "abc" accesses "telnet" on "domain 3" from "domain 1".

The input information is entered into the management terminal 15, and a user interface program 43 on the management terminal 15 sends the information entered into an input screen 51 to the management server 13. The manager program 23 on the management server 13 gets the incoming input data.

In order to determine which firewalls to set up, the manager program 23 must have access to the network structure. This is provided through the firewall structure information table 24 shown in FIG. 27, which indicates the relationships between domains and firewalls.

As shown in FIG. 27, the firewall structure information table 24 contains: a domain name field 61 indicating a domain, a firewall name field 62 indicating a firewall, and an adjacent domain name field 63 indicating a domain that is adjacent, on the other side of a firewall, to the domain specified by the domain name field 61.

In the network environment used for this embodiment, as shown in FIG. 21, a firewall 1 (14*a*) and a firewall 2 (14*b*) are connected to a domain 2 (12*b*). On the other side of the firewall 1 (114*a*) is connected a domain 1 (12*a*), and on the other side of the firewall 2 (14*b*) is connected the Internet (11). In this environment, the fields in the firewall structure information table 24 are as shown in entry 64*a*, 64*b*, 64*c*, and 64*f*.

The following is a description of the operations performed by the manager program 23 to determine the firewalls to be set up, in which reference will be made to FIG. 28 and FIG. 29.

In this operation, the manager program 23 determines the firewall to be set up by determining the firewalls along a path from the client to the server using the client address 53 used by the user, the server address 54, and the firewall structure information table 24.

The address, in domain format, is formed by combining the host name and the domain name to which the host belongs. As shown in FIG. 29(*a*), the manager program 23 first obtains the name of the domain to which the client belongs (the client domain name) by removing the host name from the client address 53, which is in the domain format. For example, if the address in the domain format is in the form "www.xyz.co.jp", the host name is "www" and the client domain name is 99 xyz.co.jp". The resulting client domain name is then added to the start of the path domain list 216 (S71).

The path domain list 216 is a list containing the names of the domains that lie on the path from the client to the server. The specific manner in which the path domain list 216 is used will be described later with reference to FIG. 29.

Next, operation A (S74) is executed (S72) for the client domain name. Operation A uses a recursively called procedure that obtains entries for the path domain list 216. Thus, when this operation is completed, the path domain list 216 contains a path from the client to the server.

Finally, sequential domain name entries in the path domain list 216 are used together with the firewall structure information table to obtain the name of the firewall between the domains. This provides a list of firewalls along the path (a path firewall list) (S73). This path firewall list is stored as an entry in the path firewall table 214, shown in FIG. 30.

The path firewall table 214 is a table for storing the results from the operation to determine the firewalls to be set up. The table includes a client address field 81, a server address field 82, and a path firewall list field 83. The client address field 81 and the server address field 82 are fields for holding client addresses and server addresses, respectively. The path firewall list field 83 holds the results from the operation described above to determine the firewalls to be set up, i.e., a list of firewalls lying on the path from the client address 53 to the server address 54. The firewalls indicated in the oath firewall list field 83 are the firewalls to be set up by the manager program 23 when a client requests a service from a server.

The following is a description of operation A (S74) described above.

The domain name, the firewall structure information table 24, and the path domain list 216 are provided as arguments to the operation A. This operation A is a recursively called procedure.

First, the manager program 53 searches for an entry where the given domain name matches the domain name field 61 of the firewall structure information table 24. Then a list is generated from the domain names in the adjacent domain name field 63 of the matching entries (S75). This will be referred to as the adjacent domain name list.

Operation A exits when there are no elements in this adjacent domain name list.

If there are entries in the adjacent domain name list (S76), a single domain name is selected from the list. If the selected domain is already used in the path domain list 216 then another domain name is selected from the adjacent domain name list (S77). If it is not used in the path domain name list, it is added to the path domain name list (S78).

Then, the domain name that has just been added is checked to see if it is identical to the domain name to which the server belongs (the server domain name) (S79). If the added domain name is identical to the domain name to which the server belongs (the server domain name) (S79), then the path domain list 216 is saved in a separate area (S710).

The domain list saved in this manner becomes the path domain list 216 that is the information returned by this operation.

Then, the domain name added last to the path domain list 216 is removed. Since a recursively called procedure is used, this operation is needed to restore the path domain search to its original state.

Then, the operation for finding the adjacent domain list is resumed (S76).

If the added domain name is not identical to the server domain name (S79), then the operation A is called recursively using the added domain name as the argument (S712).

When the operation A is completed, the domain name-that was added last to the path domain list 216 is deleted (S713). This is done since the operation A is called recursively so that when the operation is exited, the searching with the final domain name added last is completed.

Since this operation A uses recursive calls. all paths are searched even if there are multiple routes from the client to the server. Thus, all routes that can serve as paths are found.

Referring to FIG. 29, the following is a description of the specific operations performed to determine the firewalls to be set up when a client belonging to "domain 1" accesses a server belonging to "domain 3". First, "domain 1" is added to the start of the domain list 216 (S71, FIG. 29 (*a*)). Then, the operation A (S74) for generating the path domain list 216 is started (S72) with "domain 1" being passed to the, operation A as an argument. First, the entry 64*a* is retrieved as an entry that has a domain name field 61 that matches "domain 1". The contents of the adjacent domain name field 63, "domain 2," is added to the adjacent domain list (S75).

Next, "domain 2" is selected from the adjacent domain list (S76). Since "domain 2" is not in the path domain list 216 (S77), "domain 2" is added to the path domain list 216 (S78, FIG. 29 (*b*)). Since "domain 2" does not match the server domain name "domain 3" (S79), the operation A (S74) for generating the path domain list 216 is started using "domain 2" as an argument (S712). Calling the operation A (S74) using "domain 2" as an argument, "Internet" and "domain 1" are obtained for the adjacent domain list from the entry 64*b* and the entry 64*c*. Since "domain 1" is already present in the path domain list 216, it is removed from the candidates (S77). Thus, at this stage, the path domain list 216 is as shown in FIG. 29(*c*).

Next, the operation A (S74) is called with the domain name "Internet" as an argument. Using "Internet" as a key, the adjacent domains determined from the entry 64*f*, the entry 64*g*, and the entry 64*h* are, respectively, "domain 2", "domain 3", and "domain 4".

Since "domain 2" is already in the path domain list 216, it is removed from the candidates, and "domain 3" is added to the path domain list 216. Since this is identical to the server domain name (S79), this is saved as the return value (S710). Then, the "domain 3" domain that was added is deleted (S711), and searching is resumed from the state shown in FIG. 29(*c*).

Finally, the return value for this operation is the path domain list 216 when it is in the state shown in FIG. 29 (*d*), thus providing "domain 1", "domain 2", "Internet", and "domain 3".

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A network management system comprising a plurality of network devices operating in a coordinated manner and a management server managing said plurality of network devices, said management server comprising:
   means for generating a plurality of pieces of setup information based on predefined meta-level information to be used for said plurality of network devices on which settings are to be made, said plurality of pieces of setup information being generated to maintain consistency in operation of said plurality of network devices, and
   means for confirming consistency of said setup information set up in said plurality of network devices based on said meta-level information,
   wherein said meta-level information is information to be used as a source for generating setup information for each of said plurality of network devices in a method according to a predefined policy for operating said network in a coordinated manner, and
   wherein said management server further comprises:
   means for collecting setup information for each of said network devices,
   means for generating meta-level information to be checked based on the collected setup information, and
   means for checking said meta-level information to be checked with said predefined meta-level information.

2. A network management system according to claim 1, wherein each of said plurality of pieces of setup information includes tunneling setup information.

3. A network management system according to claim 1, wherein said network device is a firewall, and
   wherein each of said plurality of pieces of setup information includes setup information related to access control for said firewall.

4. A network management system according to claim 1, wherein each of said network devices is a server, and
   wherein each of said plurality of pieces of setup information includes an access privilege policy of said server.

5. A network management system according to claim 1, wherein each of said network devices is a computer executing a network application periodically exchanging data, and
   wherein each of said plurality of pieces of setup information includes setup information related to said network application.

6. A network management system according to claim 1, wherein a firewall is disposed between said management server and each of said network devices,
   wherein said management server includes means for distributing routing means for routing settings from setup information for said firewall, and
   wherein said distributed routing means including means for setting up said setup information in said network device.

7. A network management system according to claim 6, wherein said management server and said routing means includes means for performing mutual authentication and means for encrypting data.

8. A network management system having a plurality of network devices operating in a coordinated manner and a management server managing said plurality of network devices, said management server comprising:
   means for generating a plurality of pieces of setup information based on predefined meta-level information that is referred to for causing said plurality of network devices to operate in a coordinated manner; and
   means for distributing said plurality of pieces of setup information to each of said network devices,
   wherein consistency of each of said plurality of setup information for each of said plurality of network devices operating in a coordinated manner is confirmed based on said meta-level information,
   wherein said meta-level information is information to be used as a source for generating setup information for each of said plurality of network devices on a network according to a predetermined policy for operating said network in a coordinated manner,
   wherein said management server further comprises:
   means for collecting setup information for each of said plurality of network devices,
   means for generating meta-level information to be checked based on the collected setup information, and
   means for checking said meta-level information to be checked with said predefined meta-level information.

9. A network management system according to claim 8, wherein each of said plurality of pieces of setup information includes tunneling setup information.

10. A network management system according to claim 8, wherein each of said network devices is a firewall, and
    wherein each of said plurality of setup information includes setup information related to access control for said firewall.

11. A network management system according to claim 8, wherein each of said network devices is a server, and
    wherein each of said plurality of pieces of setup information includes an access privilege policy of said server.

12. A network management system according to claim 8, wherein each of said network devices is a computer executing a network application periodically exchanging data, and wherein each of said plurality of pieces of setup information includes setup information related to said network application.

13. A network management system according to claim 8, wherein a firewall is disposed between said management server and each of said network devices, wherein said management server includes means for distributing to distributed routing means routing settings from setup information for said firewall, and wherein said distributed routing means includes means for setting up said setup information in said network device.

14. A network management system according to claim 8, wherein said management server and a routing means include means for performing mutual authentication and means for encrypting data.

* * * * *